US008209796B2

(12) United States Patent
Eveleigh et al.

(10) Patent No.: US 8,209,796 B2
(45) Date of Patent: Jul. 3, 2012

(54) SYSTEM AND METHOD FOR PROVIDING TEMPERED FLUID

(75) Inventors: Robert Eveleigh, Naples, FL (US); Gary Cook, Indianapolis, IN (US)

(73) Assignee: Magarl, LLC, Naples, FL (US)

( * ) Notice: Subject to any disclaimer, the term of this patent is extended or adjusted under 35 U.S.C. 154(b) by 1712 days.

(21) Appl. No.: 11/493,164

(22) Filed: Jul. 26, 2006

(65) Prior Publication Data

US 2006/0260042 A1 Nov. 23, 2006

Related U.S. Application Data

(63) Continuation-in-part of application No. 11/180,380, filed on Jul. 13, 2005, now Pat. No. 7,657,950.

(60) Provisional application No. 60/592,710, filed on Jul. 30, 2004.

(51) Int. Cl.
*A61H 33/00* (2006.01)
(52) U.S. Cl. .......................................................... 4/620
(58) Field of Classification Search .............. 4/516, 518, 4/620, 624–627, 615, 616, 598
See application file for complete search history.

(56) References Cited

U.S. PATENT DOCUMENTS

| | | | |
|---|---|---|---|
| 3,890,651 A * | 6/1975 | Wood | 4/326 |
| 3,962,733 A | 6/1976 | Parry | |
| 4,084,270 A | 4/1978 | Kersten, Jr. | |
| 4,790,610 A | 12/1988 | Welch et al. | |
| 4,970,373 A | 11/1990 | Lutz et al. | |
| 4,998,302 A | 3/1991 | Silva | |
| 5,265,288 A | 11/1993 | Allison | |
| 5,331,694 A | 7/1994 | Mackenzie et al. | |
| 5,343,574 A | 9/1994 | Butte | |
| 5,350,112 A * | 9/1994 | Stein | 236/12.13 |
| 5,381,567 A | 1/1995 | Tanner | |
| 5,647,531 A | 7/1997 | Kline et al. | |
| 5,857,526 A | 1/1999 | Manges | |
| 5,918,323 A | 7/1999 | Smith | |
| 6,119,947 A * | 9/2000 | Couture et al. | 236/12.11 |
| 6,173,458 B1 * | 1/2001 | Maddux | 4/626 |
| 6,220,610 B1 | 4/2001 | Cox | |
| 6,269,780 B1 * | 8/2001 | Hughes | 122/14.3 |
| 6,296,626 B1 | 10/2001 | Stein | |
| 6,464,000 B1 | 10/2002 | Kloster | |
| 6,711,758 B1 | 3/2004 | Terek et al. | |
| 6,976,279 B1 | 12/2005 | Berke et al. | |
| 7,007,316 B2 * | 3/2006 | Lutz, II | 4/620 |
| 7,188,846 B2 | 3/2007 | Deavila | |
| 7,506,386 B1 * | 3/2009 | Adrian | 4/598 |

* cited by examiner

*Primary Examiner* — Huyen Le
(74) *Attorney, Agent, or Firm* — John V. Daniluck; Bingham Greenebaum Doll LLP

(57) ABSTRACT

The present invention is directed to methods and apparatus for tempering the temperature of a liquid in a fluid conducting system. More particularly, the invention relates to tempering the temperature of water supplied to a fixture from a water heater in a fluid conducting system. In some embodiments, the invention includes a restrictor for decreasing the fluid pressure in one of the hot inlet or cold inlet of the mixing valve.

31 Claims, 24 Drawing Sheets

SYSTEM AND METHOD FOR PROVIDING TEMPERED FLUID

This continuation-in-part application claims priority to U.S. Non-provisional Application Ser. No. 11/180,380, filed Jul. 13, 2005, now U.S. Pat. No. 7,657,950 which is based on U.S. Provisional Application No. 60/592,710, filed Jul. 30, 2004, both of which are hereby incorporated by reference in is their entirety.

BACKGROUND AND SUMMARY OF THE INVENTION

The present invention concerns a method and apparatus for tempering the temperature of a liquid in a fluid conducting system. More particularly, the invention relates to tempering the temperature of water supplied to a fixture from a water heater in a fluid conducting system.

Thermally controlled or thermostatic mixing valves are well known. Valves of this type receive both hot and cold fluid, typically water, and allow the fluids to mix to an intermediate temperature. The temperature is controlled using a thermally responsive control member, such as a thermostat, to assist in maintaining the fluid temperature according to an established setting.

One particular application of thermostatic mixing valves is in connection with emergency shower and eyewash systems. Toxic and hazardous chemicals are used in many environments, whether inside a factory building or outside at a remote construction site. The Occupational Safety and Health Act of 1970 was enacted to assure that workers would be provided with safe and healthful working conditions. Pursuant to this act, the Occupational Safety and Health Administration adopted regulations which require the availability of emergency eyewash and shower equipment for use as a form of first aid treatment. Emergency shower and eyewash systems have proliferated in a wide range of industries, including automotive, food processing, chemical processing, petroleum refining, steel production, pulp and paper, and waste water treatment. In each of these industries, workers may be exposed to chemicals that may cause serious tissue damage and destruction. These emergency shower and eyewash facilities are commonly associated with permanent structures and may be located inside or outside factory buildings with access to hot and cold water.

In emergency fixture systems such as eyewash and emergency shower systems, even ground water of a moderate temperature (such as in the range of 50 degrees to 60 degrees F., as is common) is often perceived to be too cold, possibly discouraging sufficient duration of use of the emergency equipment. In addition, in northern climates, the ground water itself is sometimes barely above freezing, commonly near 35 degrees F. Under these circumstances, an emergency shower and eyewash system relying solely upon ground water often provides water that would be too cold to be endured for a sufficient period of time, even by a victim of a chemical accident.

As a result, emergency shower and eyewash systems have been designed to provide tempered water by blending relatively hotter water with relatively colder water. A range of temperatures between 65 degrees F. to 95 degrees F. is comfortable to most persons. To provide tempered water within this range, most emergency fixture systems include a source of hot water, typically in the range of 140 degrees F. to 160 degrees F., that is mixed with ambient ground water.

Many outdoor or other remote worksites such as construction sites may have the same or similar hazards that are associated with indoor worksites. Such remote worksites typically do not have a ready supply of hot water. Thus, workers at such sites exposed to chemicals or other irritants typically do not have access to emergency fixture systems that provide an adequate supply of tempered fluid, properly directed, for a sufficient period of time. Such workers may be required to resort to a ground-temperature water supply from a garden hose, a squirt bottle eye rinse apparatus, or other less suitable sources of fluid to rinse the exposed area(s).

Emergency shower and eyewash systems must typically drench or rinse a user for at least 15 minutes. Thus, the source of tempered water should be able to provide the water for at least that length of time and to maintain the water within a comfortable temperature range for the user. In addition, the system should be able to maintain tempering of the water regardless of extreme fluctuations in the supply of hot or cold water to the thermostatic mixing valve. Often, a thermostatic mixing valve is used to maintain the water at an appropriately tempered temperature.

The valve should respond accordingly to failures in the supply of hot or cold water to the valve, as well as failure of the valve itself. The valve should respond to these failures without placing the user of the emergency shower or eyewash system in greater peril than the user would be without the emergency system. For example, if the cold water supply fails and only hot water in the range of 140 degrees F. to 160 degrees F. is supplied, the user could suffer burns that may be more serious than the exposure being treated. Thus, it is desirable for the valve to prevent or minimize exposure to such hot water.

In addition, fluid flow through a mixing valve must not be compromised due to relative differences in fluid pressure from a cold fluid supply and a hot fluid supply. If the relative pressure of one fluid supply is significantly higher than another fluid supply, a mixing valve may "bypass" the fluid supply of relatively lower pressure, allowing only fluid from the relatively higher pressure fluid supply to flow through a mixing valve. If a cold fluid supply is bypassed by a mixing valve, depending on the type of mixing valve used, the flow of hot fluid would either be fully restricted or would be moderately or significantly restricted. If the cold fluid is bypassed and the mixing valve fully restricts the flow of hot fluid, no fluid would flow. However, if the cold fluid is bypassed and the mixing valve only either moderately or significantly reduced the flow of hot fluid, a user could suffer severe burns. Conversely, if only cold fluid is supplied through a mixing valve, bypassing the hot fluid, a user may not be properly decontaminated by using an emergency shower and/or eyewash due to the fluid being too uncomfortably cold to the user. Accordingly, it is desirable for a system to include means as necessary to restrict the pressure of fluid from one or more fluid supply sources as to prevent unintended and undesirable bypass of a mixing valve.

Additionally, the flow of mixed fluid from an emergency fixture system with relatively low fluid flow requirements, such as an emergency eyewash system, and from an emergency fixture system with relatively high fluid flow requirements, such as an emergency shower system, must flow at appropriate temperatures. Accordingly, it is desirable, as necessary, to provide a system including one or more mixing valves allowing mixed fluid to flow to emergency fixture systems with relatively low and relatively high fluid flow requirements.

Thermostatic mixing valves typically include a housing including hot and cold inlets, a mixed fluid outlet, a valve control assembly to adjust the amounts of hot and/or cold fluid permitted to flow through the valve, and a thermostat to control movement of the control assembly. The thermostat is typically positioned at least partially in the housing to sense the temperature of the mixture of fluid therein. The thermostat includes a material that is responsive to changes in the fluid temperature. For example, if the temperature increases, then movement of the thermostat causes movement of the control assembly, either increasing the flow of cold fluid, decreasing the flow of hot fluid, or both.

Frequently, some fluid in the fluid circulation system of which the thermostatic mixing valve is a part has been stagnant for a period of time. During this stagnancy, the temperature of the hot fluid in the hot fluid supply line approaches ambient temperature, usually lower than the temperature of the hot fluid from the hot fluid supply. In a typical thermostatic mixing valve, when the temperature of the mixed fluid sensed by the thermostat is below the set point, the thermostat cooperates with the valve control assembly to increase the flow of hot fluid relative to the flow of cold fluid.

In such a stagnant fluid circulation system, when a fixture (such as an eyewash station) is eventually actuated, the thermostat is often exposed to mixed water at a temperature below the set point temperature, even if the ratio of water from the hot and cold fluid supplies otherwise would be proportioned (if the hot fluid were at temperature) to produce mixed fluid at the desired temperature. Accordingly, responsive changes in the thermostat cause the valve control assembly to move to a position that increases the flow of hot fluid relative to the flow of cold fluid, thus increasing the mixed fluid temperature. As the valve continues to receive the supply of fluid from the hot fluid supply line that was formerly stagnant, the thermostat continues to cause the valve control assembly to move to a position that further increases flow from the hot fluid supply line and/or decreases the flow of cold fluid. If a sufficient volume of stagnant fluid is in the supply line between the hot fluid supply and the mixing valve, this process may continue until the thermostat has caused the valve assembly to move to a position wide-open to maximize the flow of fluid from the hot fluid source.

Eventually, hot fluid from in the hot fluid supply (such as a water heater) progresses to the mixing valve. Because the valve control assembly is now wide-open to the hot fluid inlet, a large volume of hot fluid enters the valve housing through the hot fluid supply line that had previously been the source of the stagnant (and cooler) fluid. Once the hot fluid reaches the thermostat after mixing with whatever cold fluid is entering the valve, the thermostat responds to the temperature increase, causing the valve control assembly to move to reduce the flow of hot fluid and/or increase the flow of cold fluid. The length of time for the thermostat to respond as such and move the valve control assembly by a sufficient amount to reduce the temperature of mixed fluid below the set point can be long enough to permit a quantity of water above the set point temperature to flow from the valve.

Thus, in one aspect of the invention, a decontamination apparatus is provided, comprising a fluid supply inlet configured for coupling to a fluid supply source, a first fluid line coupled to the fluid supply inlet and formed to include a first passageway in which a first fluid flows, and a heat exchange assembly configured to heat the first fluid in the first fluid line. The apparatus also comprises a mixing valve including a valve body formed to include a first fluid inlet to receive the first fluid from the first fluid line, a second fluid inlet to receive a second fluid from a second fluid line, and a mixed fluid outlet. A decontamination fixture is coupled to the mixed fluid outlet configured to discharge the mixed fluid. Optionally, a support interconnects at least the heat exchange assembly, the first fluid line, the mixing valve, and the decontamination fixture to permit movement of the apparatus as a unit.

In an additional aspect of the invention, a restrictor may be positioned between a first fluid inlet and a mixing valve. In another aspect of the invention, one or more pressure reducing valves may be positioned within a first fluid line and/or a second fluid line prior to a mixing valve.

In yet another aspect of the invention, a first fluid from a first fluid line and a second fluid from a second fluid line may flow to a mixing valve and/or to a second mixing valve, allowing fluid to mix in a second mixing valve when fluid flow out of a decontamination apparatus is relatively low and allowing fluid to mix in a mixing valve and a second mixing valve when fluid flow out of a decontamination apparatus is relatively high. It is understood in this aspect of the invention that a first fluid from a first fluid line and a second fluid from a second fluid line may mix in one or both mixing valves under all conditions of fluid flow out of a decontamination apparatus.

In one illustrative example according to this aspect of the invention, the support is a frame including frame members coupled together, a platform coupled to the frame, and wheels coupled to the frame to facilitate movement of the decontamination apparatus.

In another illustrative example according to this aspect of the invention, the support includes a platform having a structure including a generally upwardly facing surface on which the heat exchange assembly, mixing valve, and decontamination fixture are supported, and a plurality of spaced apart support members coupled to and extending downwardly from the structure.

Illustratively according to this aspect of the invention, the first and second fluid lines comprise fluid provided by the fluid supply source.

Additionally illustratively according to this aspect of the invention the apparatus further comprises a junction in fluid communication with the fluid supply inlet, the junction splitting flow of fluid from the fluid supply source into the first fluid line and the second fluid line.

Illustratively according to this aspect of the invention the second fluid line configured to be coupled to a second fluid supply source and formed to include a second passageway in which a second fluid stream flows.

Illustratively according to this aspect of the invention the heat exchange assembly comprises a burner configured to combust fuel from a fuel source, and at least a portion of the first fluid passageway is proximate the burner so that when fuel from the fuel source is combusted at the burner, heat from the combustion is transferred into the first fluid in the first fluid passageway.

Additionally illustratively according to this aspect of the invention, the burner is coupled to a controller, the decontamination fixture includes an actuator to actuate a valve controlling flow of fluid from the decontamination fixture, the burner igniting upon actuation of the decontamination fixture by a signal sent by the controller.

Additionally illustratively according to this aspect of the invention the apparatus further comprises a fuel tank in which the fuel is stored, the fuel tank coupled to the frame to enable movement of the fuel tank upon movement of the frame.

Illustratively according to this aspect of the invention the apparatus further comprises wheels coupled to the frame to facilitate movement of the decontamination apparatus.

Additionally illustratively according to this aspect of the invention the apparatus further comprises a stand coupled to the frame to cooperate with the wheels to maintain decontamination apparatus in a position suitable for use by a user.

Illustratively according to this aspect of the invention, the apparatus further comprises a means for dampening temperature change of the first fluid prior to entry into the first fluid inlet of the thermostatic mixing valve so that the mixing valve can adjust to a particular temperature increase over a given time period.

Illustratively according to this aspect of the invention, the apparatus further comprises a diffuser coupled between the hot fluid line and the hot inlet to the mixing valve, the diffuser including a first fluid conduit and at least a second fluid conduit, a majority of the first fluid conduit being surrounded by the second fluid conduit, the first and second conduits being coupled together to cause fluid to flow into the first conduit, pass through a plurality of apertures formed in the first conduit, and into fluid outside the first conduit and in the second conduit.

Illustratively according to this aspect of the invention, the decontamination fixture is an eyewash fixture including a basin and at least one nozzle directed at least partially upwardly.

Illustratively according to this aspect of the invention, the decontamination fixture is a drench shower having fluid outlets directed at least partially downwardly.

Illustratively according to this aspect of the invention, the decontamination fixture is a wand including a trigger configured to be actuated by a user and a spray nozzle to direct the flow of fluid from the wand depending on a direction selected by a user.

According to another aspect of the invention, an apparatus for increasing the time period over which a temperature change occurs at a point in a fluid conducting system having fluid flowing therethrough comprises a first conduit having first and second ends and a plurality of openings provided between the first and second ends, a second conduit having first and second ends, the second conduit being coupled to the first conduit and at least partially surrounding at least a portion of the first conduit, wherein at least one of the openings is in the portion of the first conduit surrounded by the second conduit, one of the second conduit and the first conduit including a fluid inlet, and the other of the second conduit and the first conduit including a fluid outlet, wherein the first and second conduits are arranged to permit fluid to flow from the inlet to the outlet.

Illustratively according to this aspect of the invention, the second conduit and the first conduit are connected together to permit fluid to flow from the fluid inlet toward the fluid outlet.

Additionally illustratively according to this aspect of the invention, the first conduit and the second conduit are coupled together by a union that seals a first end of each of the first and second conduit so that fluid is inhibited from passing from the first end of the first conduit into the region between the first and second conduits adjacent the first end of the first conduit.

Further illustratively according to this aspect of the invention, a second end of the second conduit is sealed with a cap to prevent fluid from flowing out of the second end of the second conduit.

Further illustratively according to this aspect of the invention, a second end of the first conduit is spaced apart from the cap to permit fluid to flow from the second end of the first conduit adjacent the cap, and into the region between the first and second conduits.

Additionally illustratively according to this aspect of the invention, the union is formed to include an outlet to permit fluid to flow from the first end of the second conduit out of the outlet.

Further illustratively according to this aspect of the invention, the union includes a first end having an opening sized to receive the first end of the second conduit, and the union includes a second end having an opening sized to receive the first end of the first conduit.

Further illustratively according to this aspect of the invention, the first and second ends of the union are separated by a generally frustoconical reducing region.

Illustratively according to this aspect of the invention, the first and second fluid conduits are coupled so that fluid flowing within the first conduit flows substantially in the opposite direction as fluid flowing within the second conduit.

Additionally illustratively according to this aspect of the invention, the apparatus further comprises a third fluid conduit, wherein at least a portion of the first fluid conduit is surrounded by the second and third fluid conduits, and at least a portion of the second fluid conduit is surrounded by the third fluid conduit.

Further illustratively according to this aspect of the invention, the fluid flowing through and immediately adjacent to the first and third fluid conduits flows in a direction substantially parallel within each conduit.

Illustratively according to this aspect of the invention, the apparatus further comprises a plurality of apertures in the second fluid conduit comprise a first aperture, a second aperture, and a third aperture, the first aperture being spaced from the second aperture by a first distance, and the second aperture being spaced from the third aperture a second distance, the first distance being greater than the second.

Illustratively according to this aspect of the invention, the first and second fluid conduits define a void having a volume capable of receiving at least 0.13 gallons of fluid.

Additionally illustratively according to this aspect of the invention, the first, second and third conduits define a void having a volume capable of receiving at least 0.9 gallons of fluid.

Illustratively according to this aspect of the invention, the plurality of each of the apertures is substantially of one of the shapes selected from the group consisting of: circular, square, rectangular, diamond-shaped, ovular, triangular, and irregular.

According to another aspect of the invention, a fluid mixing apparatus for use in a fluid flow network comprises a mixing valve including a housing having a hot fluid inlet, a cold fluid inlet, a mixed fluid outlet, a mixing region, and a movable valve assembly to adjust the relative flow of fluid through the hot fluid inlet and the cold fluid inlet, and a first fluid conduit in fluid communication with the mixing valve, the first fluid conduit including an inlet through which fluid flows from a hot fluid supply line and an outlet through which fluid flows toward the mixing valve, the first fluid conduit constructed to expose fluid flowing through the inlet to a heat sink.

Illustratively according to this aspect of the invention, the heat sink is a second fluid mass downstream of a first fluid mass. Additionally illustratively according to this aspect of the invention, the apparatus further comprises a second fluid conduit coupled to the first fluid conduit, the first fluid conduit formed to include the inlet and formed to include a first conduit outlet through which fluid is capable of flowing out of the first fluid conduit and into the second fluid conduit. Further illustratively according to this aspect of the invention, the apparatus further comprises a third conduit between the first and second fluid conduits. Additionally illustratively according to this aspect of the invention, the first fluid conduit has a length, and is formed to include a plurality of openings, at least one of the plurality of openings positioned between the ends of the first fluid conduit. Additionally illustratively according to this aspect of the invention, a portion of the first fluid conduit is surrounded by the second fluid conduit. Additionally illustratively according to this aspect of the invention, at least one of the first and second fluid conduits includes a plurality of fins extending from a surface of said one of the first and second fluid conduits. Further illustratively according to this aspect of the invention, said one of the first and second fluid conduits is formed to include a plurality of apertures, at least one of said plurality of apertures positioned between the ends of the fluid conduit including fins.

Illustratively according to this aspect of the invention, the heat sink is a thermally conductive material having a mass per unit of linear length of net fluid flow greater than the average mass per unit of linear length of net fluid flow in the fluid flow network. Additionally illustratively according to this aspect of the invention, the heat sink comprises copper.

Illustratively according to this aspect of the invention, the heat sink surrounds the first conduit so that fluid flowing from the first fluid conduit subsequently flows through a passageway defined by the heat sink.

According to another aspect of the invention a decontamination apparatus comprising a fluid heater, a cold fluid supply line, a hot fluid supply line for supplying hot fluid from the fluid heater to a thermostatic mixing valve, the thermostatic mixing valve having a hot fluid inlet for receiving fluid from to the hot fluid supply line, a cold fluid inlet for receiving fluid from the cold fluid supply line, and a mixed fluid outlet for supplying fluid to a mixed fluid supply line through which one, the other, or both of the hot and cold fluids flow from the thermostatic mixing valve, an emergency fixture connected to the mixed fluid supply line for supplying fluid therefrom to a user and configured to deliver the mixed fluid at a flow rate and pattern to decontaminate effectively at least a portion of the user's body, and a diffuser coupled between the hot fluid supply line and the thermostatic mixing valve for increasing the time over which a temperature change is observed at the hot fluid inlet.

In another aspect of the invention a decontamination apparatus comprises a fluid supply inlet configured for coupling to a fluid supply source, a circulation network coupled to the fluid supply inlet and formed to include a first passageway in which a first fluid flows, a heater to heat the first fluid stream in the circulation network, a decontamination fixture connected to the circulation network to receive heated fluid from the heater, and a support interconnecting at least the heater, fluid circulation network, and the decontamination fixture to permit movement of the apparatus as a unit.

Illustratively according to this aspect of the invention, the apparatus further comprises a mixing valve comprising a valve body formed to include a first fluid inlet to receive a first fluid from a first fluid line, a second fluid inlet to receive a second fluid from a second fluid line, and a mixed fluid outlet. Additionally illustratively according to this aspect of the invention, the mixing valve further includes a valve assembly operably coupled to a thermostat to move the valve assembly to adjust the flow of at least one of the first and the second fluids to control the mixed fluid temperature.

Additionally illustratively according to this aspect of the invention, the support is a pallet into which the tines of a fork truck can be inserted to lift and move the apparatus as a unit. Additionally illustratively according to this aspect of the invention, the support is a frame having wheels coupled thereto so that a user can move the apparatus as a unit. Additionally illustratively according to this aspect of the invention, the decontamination fixture includes a valve operated by an actuator, and operation of the actuator causes fluid to flow from the circulation network through the mixing valve and through the decontamination fixture. Further illustratively according to this aspect of the invention, operation of the actuator causes the heater to ignite and heat the fluid flowing through the circulation network.

Additionally illustratively according to this aspect of the invention, the apparatus further comprises a diffuser positioned in the circulation network to receive fluid from the heater, the diffuser configured to increase the time over which a temperature increase is observed at the inlet of the fluid from the heater to the mixing valve.

Illustratively according to this aspect of the invention, the apparatus further comprises a fuel tank to store fuel usable by the heater to generate heat for heating the fluid in the circulation network. Additionally illustratively according to this aspect of the invention, the support is a frame having wheels coupled thereto so that a user can move the apparatus as a unit.

Additionally illustratively according to this aspect of the invention, the heater is configured to heat fluid on demand as the fluid flows through the circulation network.

Illustratively according to this aspect of the invention, the heater includes a storage tank and is configured to heat fluid and store the heated fluid in the storage tank.

Additional features of the invention will become apparent to those skilled in the art upon consideration of the following detailed description of a preferred embodiment exemplifying the best mode of carrying out the invention as presently perceived.

BRIEF DESCRIPTION OF DRAWINGS

The detailed description particularly refers to the accompanying figures in which.

DETAILED DESCRIPTION

Figure 1:
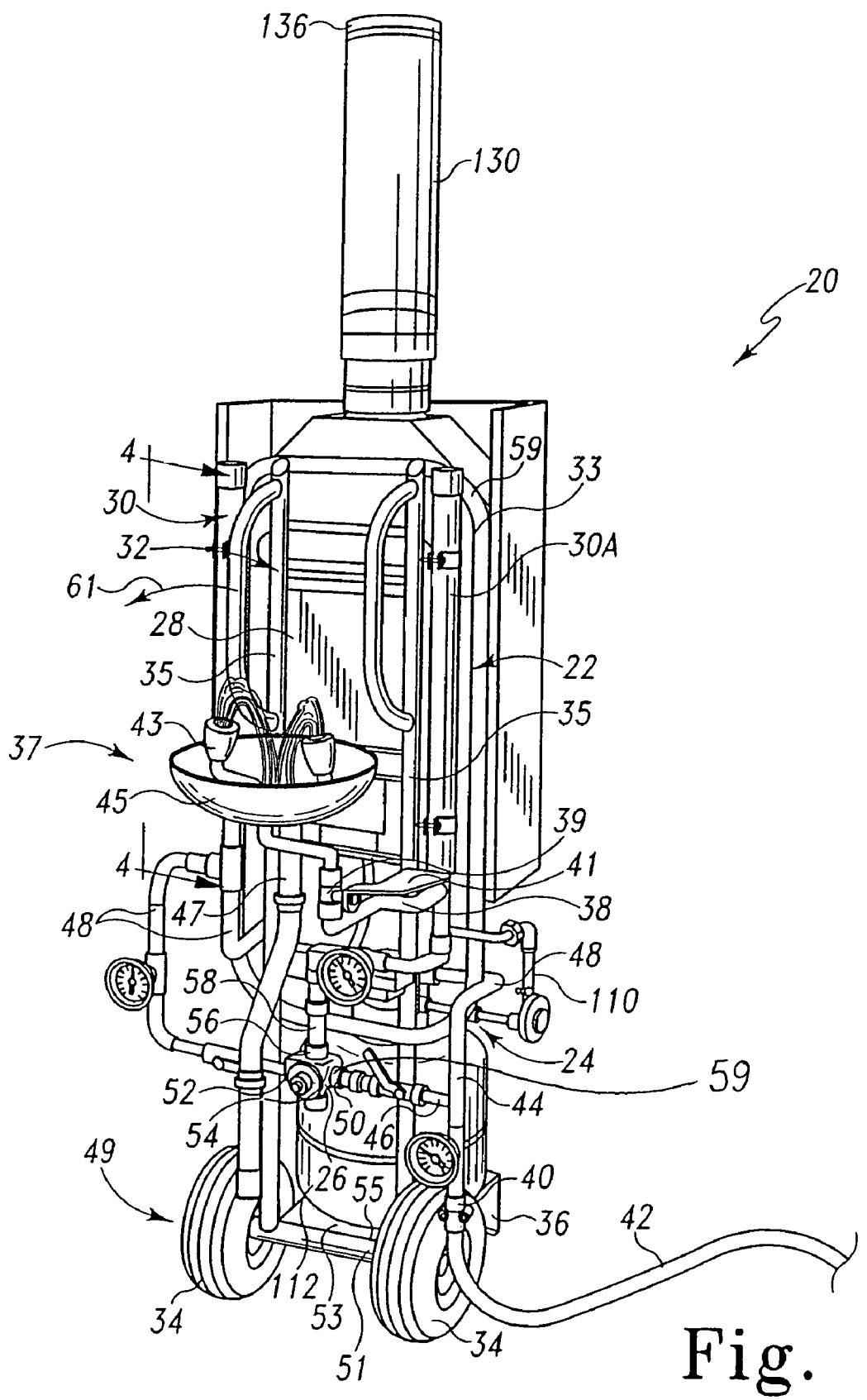
FIG. 1 illustrates a decontamination apparatus for tempering fluid to rinse substances from body parts of a victim, the apparatus having a heat exchange unit, fuel source, decontamination fixture, fluid circulation network, diffuser, and mixing valve coupled with a support to facilitate transportation of the decontamination apparatus.

As illustrated in FIG. 1, a decontamination apparatus 20 includes a heat exchange assembly 22, a fluid circulation network 24, and a mixing valve 26. In the embodiment of FIG. 1, the heat exchange assembly includes a heater 28 for supplying heat to a fluid for increasing the temperature of the fluid. To facilitate transportation of decontamination apparatus 20, a support 32 is illustratively provided and is connected to fluid circulation network 24 and heat exchange assembly 22. A plurality of wheels 34 and a stand 36 are coupled to frame 32. Wheels 34 and stand 36 cooperate with support 32, illustratively a frame 33, to support fluid circulation network 24 and heat exchange assembly 22 in the position depicted in FIG. 1.

Circulation network 24 includes fluid supply inlet 40 to which a fluid supply line 42 is couplable, fluid supply line 42 illustratively shown as a hose in FIG. 1. Fluid supply inlet 40 leads to a tee or other junction 44 at which fluid flowing through circulation network 24 is divided—a portion of the fluid flows into a cold fluid line 46 and a portion flows into hot fluid line 48. Cold fluid line 46 extends from junction 44 to mixing valve 26, and is coupled to cold inlet 50 of mixing valve 26. Hot fluid line 48 extends from junction 44, to heater 28, and is coupled to mixing valve 26. As fluid flows through hot fluid line 48 adjacent heater 28, heat generated by heater 28 is applied to hot fluid line 48, increasing the temperature of the fluid flowing therein. Hot fluid line 48 is coupled to hot inlet 52 of mixing valve 26. Although FIG. 1 discloses junction 44 as dividing a single supply line into the hot and cold fluid streams, it is within the scope of this disclosure to have separate hot and cold fluid supply lines supplying respective hot and cold fluids.

As illustrated in FIG. 1, mixing valve 26 includes a housing 54 in which are mixed hot fluid flowing through hot inlet 52 and cold fluid flowing through cold inlet 50. Illustratively, mixed fluid temperature is controlled using a suitable thermostat and valve assembly, as is known in the art. While reference is made to thermostatic mixing valves, it is within the scope of this disclosure to use other types of mixing valves or systems as are known in the art, illustratively proportional mixing techniques, pressure balancing valves, pressure reducing valves, and the like. Mixed fluid flows from housing 54 through mixed fluid outlet 56, and into mixed fluid line 58. Mixed fluid line 58 leads to an emergency fixture depicted illustratively in FIG. 1 as an eyewash fixture 37.

Figure 21:
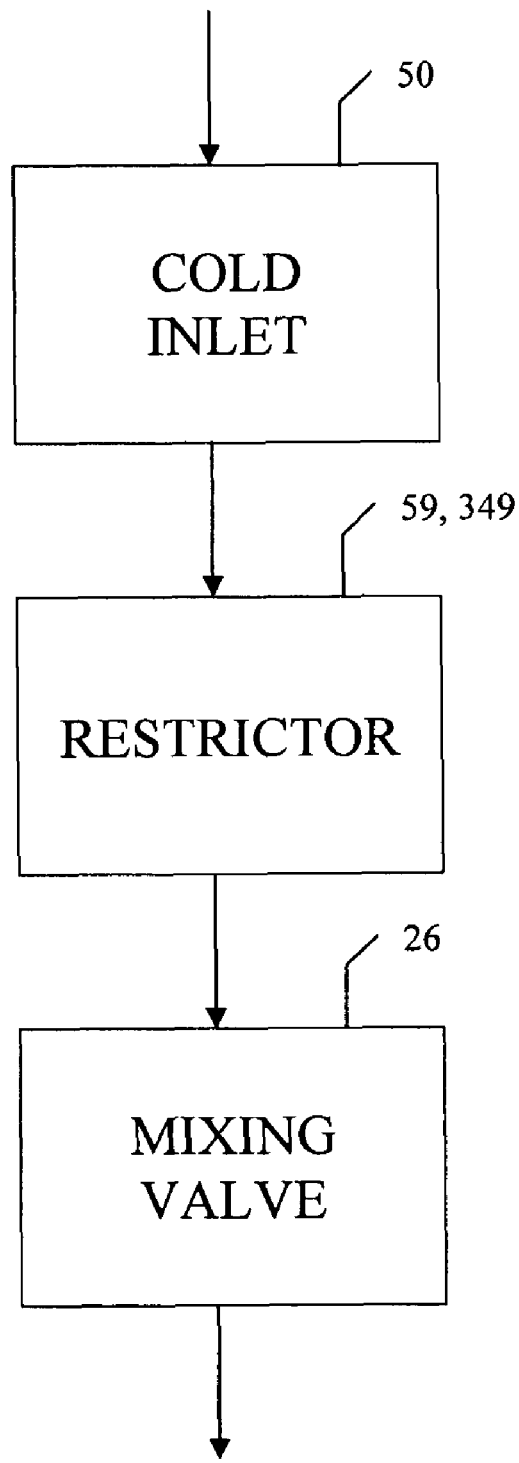
FIG. 21 is a diagrammatic view of a portion of a decontamination apparatus showing the location of a restrictor positioned between a mixing valve and a cold inlet.

A restrictor 59 (internal location as shown in FIGS. 1 and 21) may be positioned between cold inlet 50 and mixing valve 26. The arrows in FIG. 21 represent the direction of fluid flow. Restrictor 59 may also define one or more holes. In one embodiment, restrictor 59 may be comprised of copper, be circular in shape, 1¼" in diameter, $^{10}/_{1000}$" ($^{1}/_{100}$") thick, and define a hole $^{3}/_{16}$" in diameter. Restrictor 59 may be comprised of metal, plastic, glass, or other suitable materials, may be sized and shaped with diameters and thicknesses suitable for the particular application, and may define one or more holes of varying diameters. Restrictor 59 operates to equalize differentials in pressure between cold fluid line 46 and hot fluid line 48 from heater 28 to mixing valve 26. Restrictor 59 is therefore beneficial by equalizing pressures of cold fluid line 46 and hot fluid line 48 entering mixing valve 26 to stop mixing valve 26 from going into bypass, allowing only cold fluid from cold fluid line 46 to flow through mixing valve 26. Bypass occurs in a thermostatic mixing valve when the pressure of the fluids in a fluid line or lines entering a mixing valve are either zero or so insufficient as not to be recognized by the mixing valve. Instead of the mixing valve preventing all fluid from flowing in or out, the mixing valve would bypass the fluid line or lines of zero or little pressure, allowing the fluid from the fluid lines with sufficient pressure to pass through the mixing valve. Conversely, if the relative pressure of one of the fluids is so high compared to the other fluids entering the mixing valve, the mixing valve may bypass the fluids of lesser pressure, allowing only the highest pressure fluid to pass through the mixing valve. Comparable operation of this "bypass" is possible with other types of mixing valves, as is well known in the art. Accordingly, if fluid pressure is zero or too low from hot fluid line 48, mixing valve 26 may revert to bypass blocking off hot fluid from hot fluid line 48, allowing only cold fluid from cold fluid line 46 to flow through mixing valve 26. If fluid pressure is zero or too low from cold fluid line 46, mixing valve 26 may revert to bypass blocking off the flow of cold fluid from cold fluid line 46 and, depending on the type of mixing valve, hot fluid from hot fluid line 48 would either be fully restricted or would be moderately or significantly restricted. If cold fluid from cold fluid line 46 is bypassed and mixing valve 26 fully restricts the flow of hot fluid from hot fluid line 48, no fluid would flow. However, if cold fluid from cold fluid line 46 is bypassed and mixing valve 26 only either only moderately or significantly reduced the flow of hot fluid from hot fluid line 48, a user could suffer severe burns. Additionally, if fluid pressure is too high from cold fluid line 46, mixing valve 26 may only sense cold fluid and may revert to bypass blocking off the hot fluid from hot fluid line 48. Restrictor 59, when positioned between cold inlet 50 and mixing valve 26, would act in this latter fashion to prevent bypass by decreasing the pressure of the cold fluid from cold fluid line 46. It is within the scope of this embodiment that a restrictor 59 may also be positioned between hot inlet 52 and mixing valve 26, with or without a restrictor 59 being positioned between hot inlet 50 and mixing valve 26.

Figure 22:
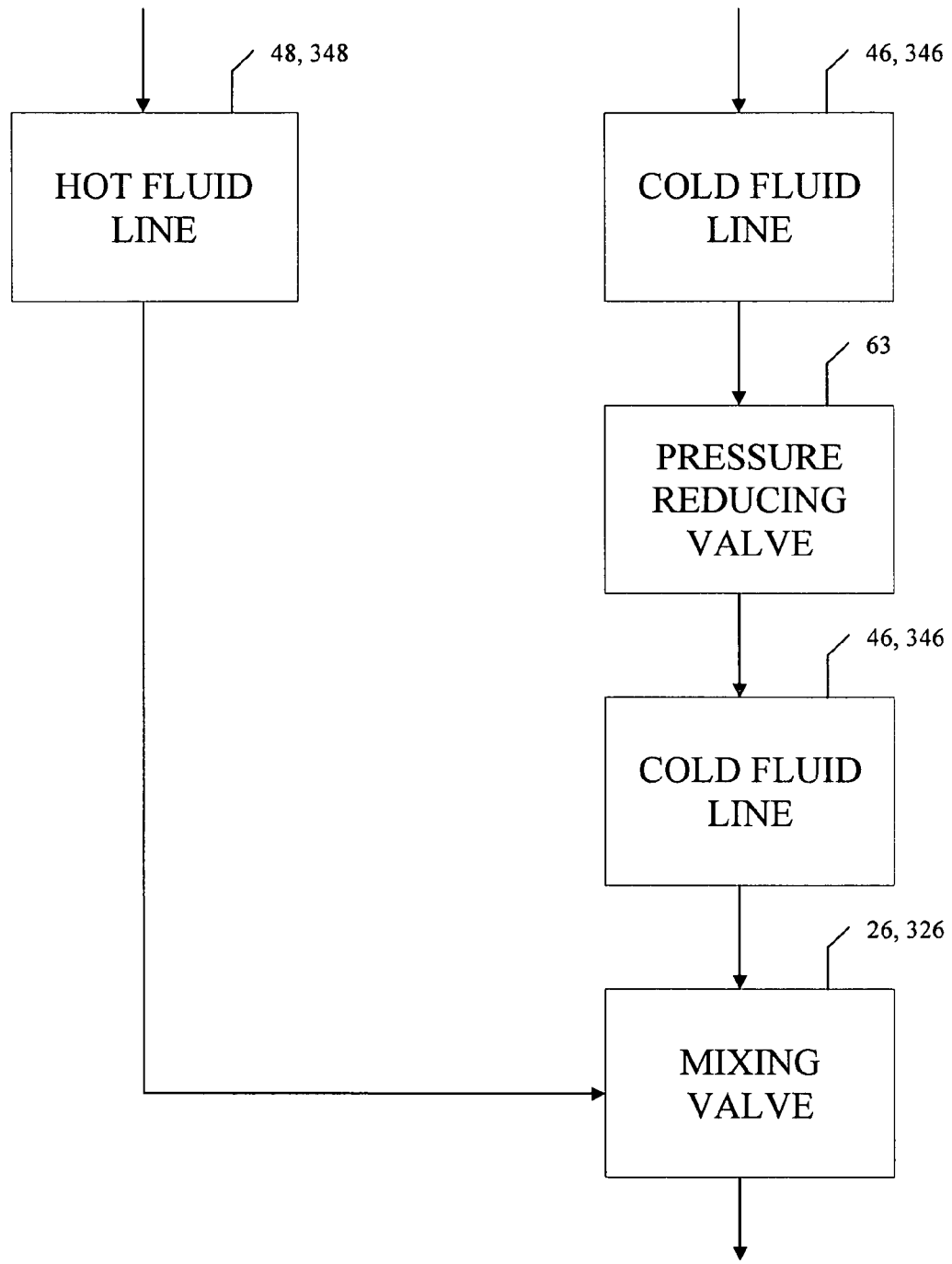
FIG. 22 is a diagrammatic view of a portion of a decontamination apparatus showing the location of a pressure reducing valve positioned within a cold fluid line prior to a mixing valve.

While reference is made to restrictor 59, it is within the scope of this disclosure to use other means or systems as are known in the art to reduce the pressure of fluid flow through a conduit, such as pressure reducing valves and the like. For example, as shown in FIG. 22, pressure reducing valve 63 may be positioned within cold fluid line 46 prior to mixing valve 26. The arrows in FIG. 22 represent the directions of fluid flow. Pressure reducing valve 63 may operate to equalize differentials in pressure between cold fluid from cold fluid line 46 and hot fluid from hot fluid line 48 to mixing valve 26 by restricting the pressure of cold fluid from cold fluid line 46. A suitable pressure reducing valve 63 is available in the form of a model number 600 from Wilkins Industries, a Zurn Company, Erie, Pa., USA, although other pressure reducing valves are suitable, as are known in the art.

Figure 23:
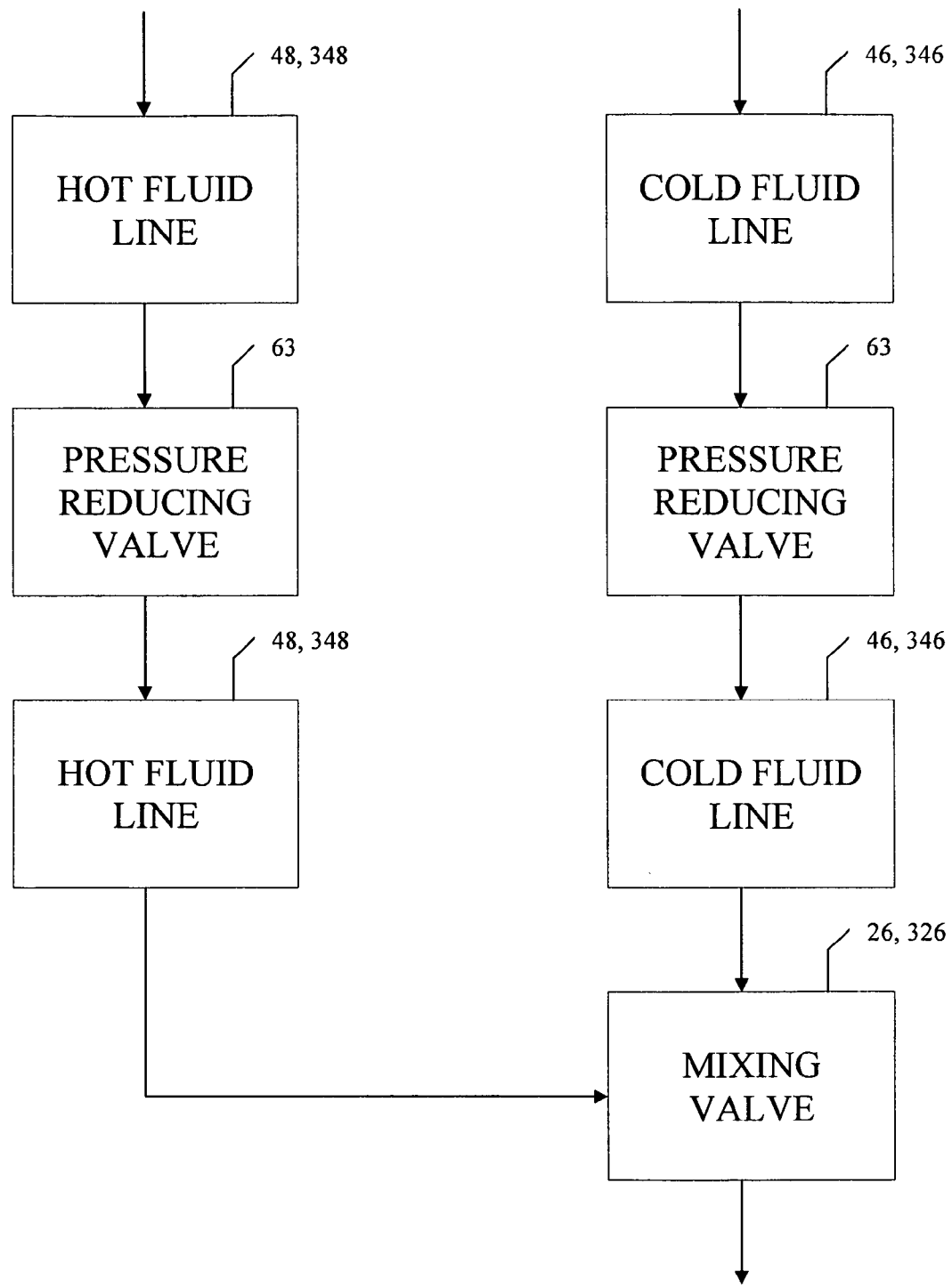
FIG. 23 is a diagrammatic view of a portion of a decontamination apparatus showing the location of a pressure reducing valve positioned within a cold fluid line prior to a mixing valve and the location of a pressure reducing valve positioned within a hot fluid line prior to a mixing valve.

An additional embodiment, as shown in FIG. 23, demonstrates an embodiment utilizing multiple pressure reducing valves. In this embodiment, pressure reducing valves 63 may be positioned within cold fluid line 46 prior to mixing valve 26 and may also be positioned within hot fluid line 48 prior to mixing valve 26. The arrows in FIG. 23 represent the directions of fluid flow. Pressure reducing valves 63 may operate to equalize differentials in pressure between cold fluid from cold fluid line 46 and hot fluid from hot fluid line 48 to mixing valve 26 by restricting the pressure of cold fluid from cold fluid line 46 and the pressure of hot fluid from hot fluid line 48. It is within the scope of this embodiment that one or more pressure reducing valves 63 may be positioned either directly adjacent to mixing valve 26 or prior to an inlet of mixing valve within cold fluid line 46 and/or cold fluid line 48.

As illustrated in FIG. 1, circulation network 24 has positioned therein a first diffuser 30 between the portion of hot fluid line 48 adjacent heater 28 and hot inlet 52 of mixing valve 26. Illustratively, circulation network 24 has positioned therein a second diffuser 30A between mixed fluid outlet 56 from mixing valve 26 and eyewash fluid inlet line 38. Eyewash fluid inlet line 38 includes a valve 39 therein that is operable by actuation of actuator 41. When a user actuates actuator 41, opening valve 39, mixed fluid flows from mixed fluid outlet 56 through mixed fluid line 58, toward eyewash fixture 37, through eyewash fluid line 38, and out eyewash outlets 43 of eyewash fixture 37. Refuse fluid is captured, at least in part, by basin 45 and is permitted to exit by way of drain 47. Illustratively, when a user actuates actuator 41, a burner or other heating element (described more fully below) is ignited or otherwise powered to heat fluid flowing through hot fluid line 48. Optionally, decontamination apparatus 20 can be provided as a mobile unit.

As illustrated in FIG. 1, frame 33 includes side members 35 that are coupled to heater 28. Side members 35 are coupled to a base 49 illustratively including an axle tube 51 coupled to lower ends of side members 35 and an axle (not shown) extending therethrough. Wheels 34 are coupled to the axle to facilitate transport of decontamination apparatus 20. Base 49 of frame 33 further includes a platform 53 having a generally upwardly facing surface 55. Handles 57 are coupled to side frame members 35 to further facilitate transport. Upper frame section 59 is connected to side members 35, and illustratively is a generally rectangular tubular section that extends outwardly from side members 35 to provide additional support for heater 28. Also connected to frame 33 are circulation network 24, mixing valve 26, fuel tank 112, and emergency (eyewash) fixture 37, whether directly connected to frame 33 or indirectly through other parts of decontamination apparatus 20. To move decontamination apparatus 20, a user simply disconnects any fluid supply line 42 connected to fluid supply inlet. The user positions a foot on axle tube 51 and pulls handles 57 in direction 61, lifting stand 36 from engagement with the ground or floor. The user can then move decontamination apparatus 20 by guiding handles 57 and rolling the apparatus using wheels 34.

Other fixtures are possible and are within the scope of this disclosure. For example, a decontamination fixture having one or more sprayers or wands (not shown) may be included. Such a sprayer or wand could include a trigger or other actuator that can be actuated by a user. The sprayer or wand may include a spray nozzle to create a desired pattern of spray. A user can use such a sprayer or wand to direct the flow of fluid from the wand in a pattern and/or a direction selected by a user.

Figure 3:
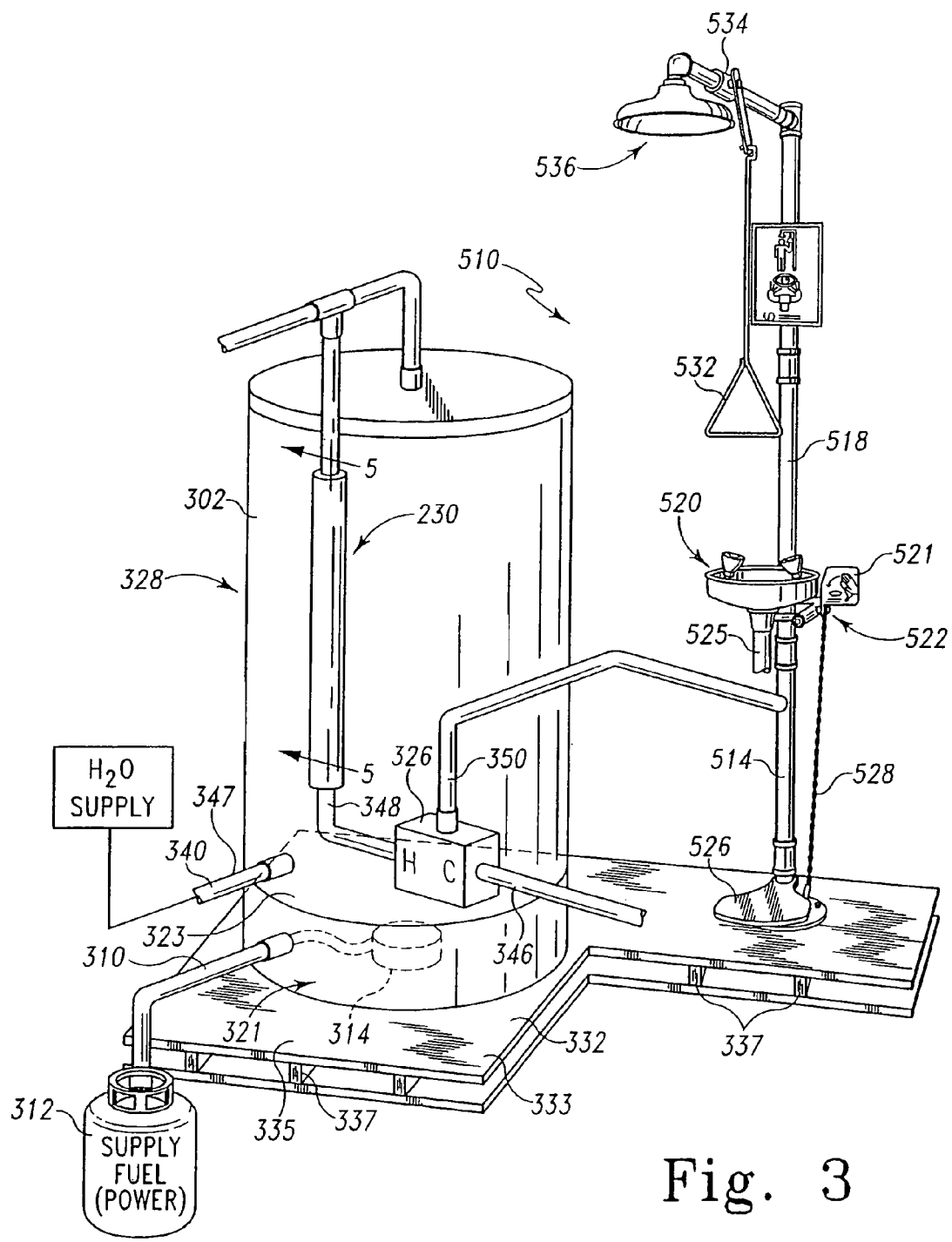
FIG. 3 illustrates a decontamination apparatus for tempering fluid including a heat exchange unit, fluid circulation network, decontamination fixture, diffuser, and mixing valve positioned on a support platform to facilitate transportation of the decontamination apparatus.

As shown in FIG. 3, decontamination apparatus 320, described in further detail below, is positioned on support 332. Support 332 is a platform 333 upon which is positioned a heater 328, emergency fixture 510, and illustratively mixing valve 326. Platform 333 includes a generally upwardly facing surface 335 sized to support heater 328 and emergency fixture 510 thereon. Support members 337 extend from platform 333 downwardly toward base 339. Support members 337 are illustratively spaced apart from each other and are positioned to receive the tines of a fork truck, or other transportation or lifting device, therein to permit convenient transport of decontamination apparatus 320. To move decontamination apparatus 320 from one location to another, any fluid supply lines, drain lines, and fuel (or other power source) lines are disconnected, and transportation or lifting device (not shown) is positioned in spaces between support members 337 and platform 333 is lifted so that support 332 and decontamination apparatus 320 are elevated above the ground or floor. Decontamination apparatus 320 is then moved to the desired location.

While decontamination apparatus 20 of FIG. 1 and decontamination apparatus 320 of FIG. 3 are illustrative examples configured for convenient transport, using frame 20 of FIG. 1 and using a fork-truck or similar device to transport apparatus 320 of FIG. 3, it is understood that other configurations are within the scope of this disclosure. Other portable, semi-portable, and non-portable configurations are contemplated. A self-contained fluid supply vessel may be provided instead of using water from a source such as a well, municipal water supply, or other similar water source. Such an apparatus could be transported using a transportation device such as a truck, automobile, military vehicle, train, helicopter, or other mode of transportation. A decontamination apparatus such as apparatus 320 of FIG. 3 could be affixed using known methods to a structure in a building, for example, if portability of the apparatus is not desired.

In one configuration rather than having a burner, heating element 314 is provided in an electric heater that enables a user to set the temperature of hot water in the hot water supply to achieve and maintain a higher temperature than is possible with typical residential water heater heating elements. In one exemplary configuration, a tubular heating element manufactured by Watlow Electric Manufacturing Company, 12001 Lackland Road, St. Louis, Mo., USA 63146 is capable of maintaining water at and above 180 degrees F. at typical flows for a sufficient time to satisfy requirements for emergency applications. Such heating elements are typically constructed to withstand higher temperatures and currents than standard residential heating elements. Further, thermostats associated with such heating elements are constructed to permit a user to select a temperature above about 185 degrees F.

Figure 4:
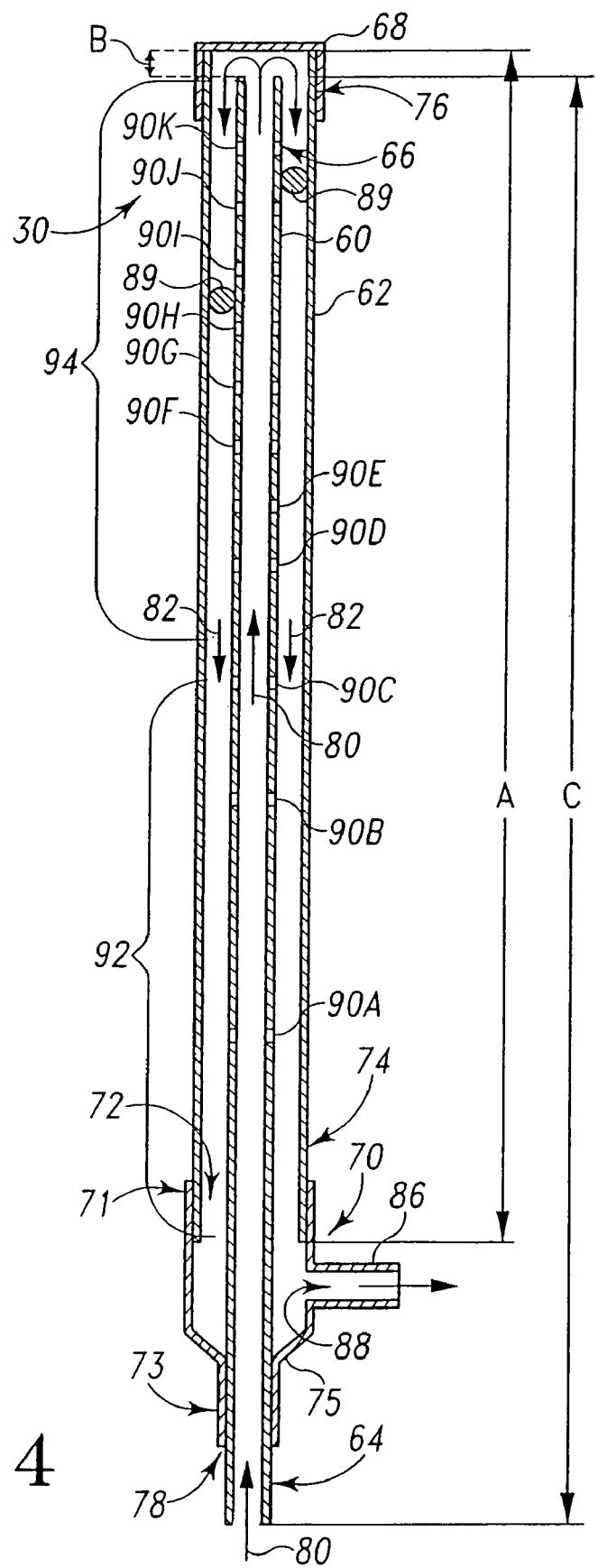
FIG. 4 is a cross-sectional view of the diffuser shown in FIG. 1, taken along line 4-4 thereof, showing the first and second conduits cooperating to form a two-pass diffuser.

Referring to FIG. 4, diffuser 30 includes a first conduit 60 and a second conduit 62 surrounding, illustratively, a majority of first conduit 60. First conduit 60 includes a first end 64 serving as an inlet of fluid to diffuser 30, and an opposite second end 66. Second conduit 62 includes a first end 74 serving as an outlet for fluid from diffuser 30 and an opposite second end 76. As illustrated in FIG. 4, a cap 68 is coupled to second end 76 to close second conduit 62. Cap 68 is coupled to second end 76 illustratively with solder applied around the perimeter of cap 68. It is understood that this diffuser design is illustrative only and that it is within the scope of this disclosure for diffusers to be different in design.

In the illustrative embodiment, diffuser 30 includes a union 70 to assist in positioning first conduit 60 relative to second conduit 62 and to assist in directing or guiding the flow of fluid through diffuser 30. Union 70 is coupled to first ends 64, 74 of respective first and second conduits 60, 62, illustratively with solder. Union 70 includes, at a first end 71 thereof, a first opening 72 to receive first end 74 of second conduit 62. Union 70 includes, at a second end 73 thereof, a second opening 78 sized to receive first end 64 of first conduit 60.

Referring to FIG. 4, in operation, fluid enters diffuser 30 through first end 64 of first conduit 60 adjacent second end 73 of union 70. Depending on the outlet configuration (described in more detail below), fluid generally flows in first direction 80 through first conduit 60 from its first end 64 to its second end 66. Second end 66 is spaced apart from cap 68, permitting fluid to exit second end 66 of first conduit 60 and reverse its direction to flow in a second direction 82, opposite first direction 80. First conduit 60 is positioned substantially within second conduit 62 so that when fluid exits second end 66, the fluid remains within the volume defined by cap 68, second conduit 62, and portions of union 70.

As shown in FIG. 4, union 70 includes, between its first and second ends 71, 73, a reducing region 75 that necks down or reduces the diameter of union 70 from a diameter sized to receive the outside diameter of second conduit 62 to a diameter sized to receive the outside diameter of first conduit 60, thus forming a seal to prevent fluid from flowing from second conduit 62 out of the fluid circulation network between first conduit 60 and second end 73 of union 70. Union 70 includes an outlet 86 formed between first end 71 thereof and reducing region 75. Illustratively, reducing region 75 is frustoconical in shape. An outlet 86 surrounds an opening 88 formed in union 70 to permit fluid flowing in direction 82 to exit diffuser 30 and flow toward mixing valve 26.

Figure 5:
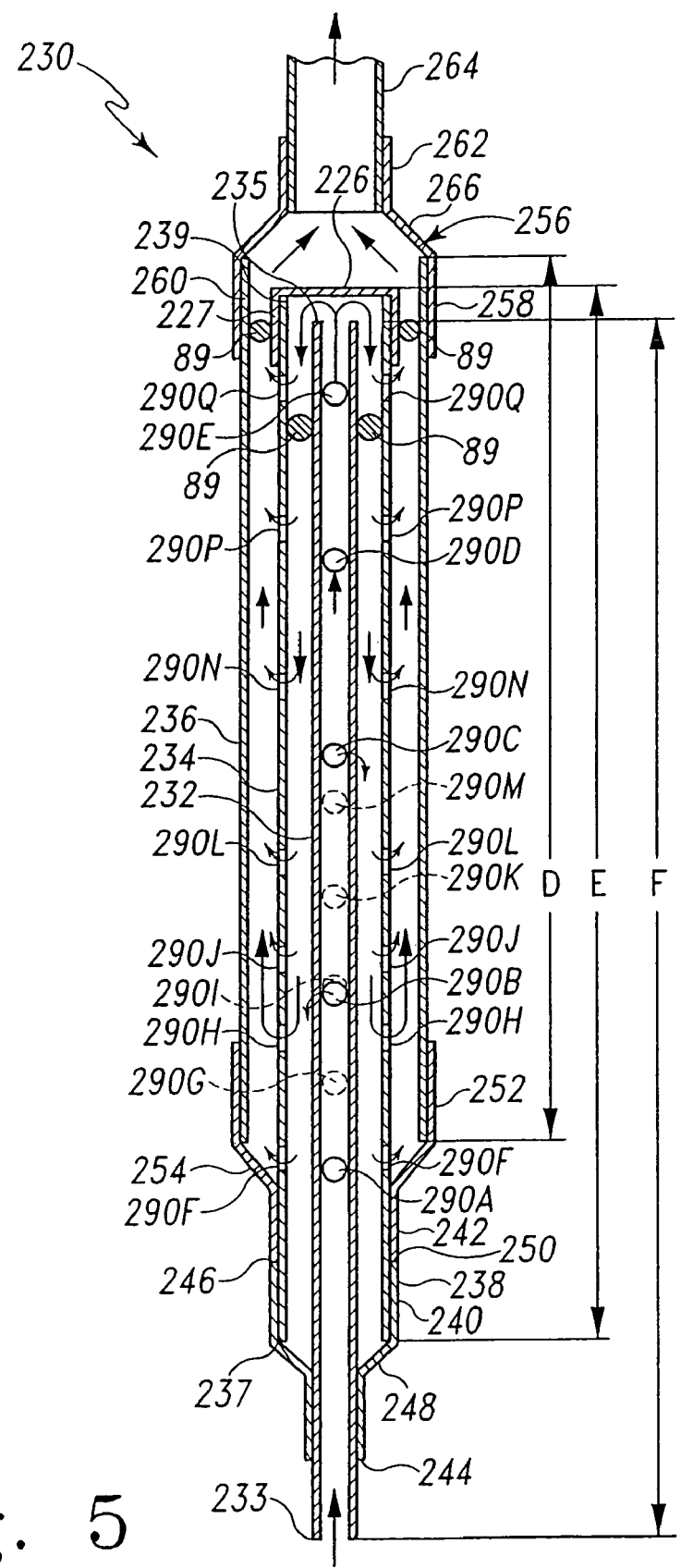
FIG. 5 is a cross-sectional view of the diffuser shown in FIG. 3, taken along line 5-5 thereof, showing the first, second, and third conduits cooperating to form a two-pass diffuser.

As illustrated in FIGS. 4 and 5, optional spacers 89 are positioned between the conduits to discourage relative movement therebetween. Illustratively, spacers 89 are positioned adjacent second end 66 of first conduit 60 and about the circumference of first conduit 60 to maintain the relative position of first and second conduits 60, 62. Spacers 89 are illustratively constructed using crimped pieces of copper alloy tubing commonly used in the plumbing industry. If included, spacers 89 may, however, be constructed using any suitable material(s) and may have any shape sufficient to maintain the relative position of conduits in a diffuser such as diffuser 30 and still permit adequate flow of fluid therethrough.

A first diffuser outlet configuration is depicted in diffuser 30 of FIG. 4. A series of apertures 90, designated individually as 90A through 90K, are formed in first conduit 60 at various positions around first conduit 60 and along its length. Apertures 90A, B, and C are formed in, approximately, the first half 92 of the length of first conduit 60. Apertures 90D through K are positioned in, approximately, the second half 94 of the length of first conduit 60. Because apertures 90A through 90K are positioned along the length of first conduit 60, portions of fluid flowing through first conduit 60 exit through apertures 90 and mix with fluid flowing outside of first conduit 60 and in second conduit 62. Illustratively, conduit 60 has an inside diameter of about 0.8 inches and has an overall length C of about 29 inches, and conduit 62 has an inside diameter of about 1.25 inches and has an overall length A of about 24.25 inches. Second end 66 is spaced apart from cap 68 by a distance of B, illustratively about 0.75 inches. However, it is understood that other sizes for conduit 62 are within the scope of this invention.

As 'fresh' hot fluid (a second mass of fluid) that has been recently heated by heater 28 first flows through first conduit 60, the fresh hot fluid mixes with the previously stagnant fluid that was in first conduit 60 and is in second conduit 62. Because apertures 90A-90J are provided along the length of first conduit 60, some of the fresh hot fluid flows through the first apertures 90 (for example 90A, 90B and 90C) encountered by the fluid flow without flowing all the way to second end 66 of conduit 60, thus blending the fluid and rendering the blended fluid a temperature between the temperature of the second mass of fluid and the stagnant fluid (a first mass of fluid) temperature. As more fresh hot fluid flows into first conduit 60, the blended temperature gradually approaches that of the fresh hot fluid. By blending the fluids as such, the fresh hot fluid does not reach mixing valve 26 at full temperature all at once, but rather reaches mixing valve 26 blended with previously stagnant fluid, thus providing the mixing valve a gradual increase in fluid temperature instead of the more immediate increase obtained without this blending.

First diffuser outlet configuration depicted in FIG. 4 illustrates apertures 90A through 90J formed as holes in first conduit 60 on generally opposite sides of the conduit, formed, for example, by drilling through a first point along the length of first conduit 60 and permitting the drilling device to penetrate through the opposite side of the conduit. It is understood, however, that any number of apertures 90A through 90J may be provided along the length and circumference of conduit 60. In the illustrative embodiment, aperture 90A is positioned about 13 inches from first end 64. Aperture 90B is positioned about 17 inches from first end 64. Aperture 90C is positioned about 19 inches from first end 64. Aperture 90D is positioned about 21 inches from first end 64. Aperture 90E is positioned about 1 inch from aperture 90D. Apertures 90F through 90K are each positioned from the immediately adjacent aperture approximately the same distance as apertures 90D and 90E are spaced apart. Illustratively, apertures 90A-J are holes drilled through conduit 60 so that a pair of holes, each 180 degrees around the circumference of conduit 60 from the other, is at each position along the length of first conduit 60. Illustratively, apertures 90 are holes of 0.125 inch diameter drilled in conduit 60; however, apertures 90A-J may be of different sizes and shapes and each may be different from one or more other apertures.

Although certain illustrative outlet configurations are disclosed herein, it is within the scope of this disclosure to use any suitable shape of aperture or combination of shapes. It is also within the scope of this disclosure to space a wide range of sizes and numbers of such apertures 90 apart from one another by various distances to achieve a desired mixing of fluid inside an internal conduit with the fluid outside the internal conduit, and to maintain adequate flow through the diffuser. By way of example, additional outlet configurations are depicted in FIGS. 8 through 13.

Figure 2:
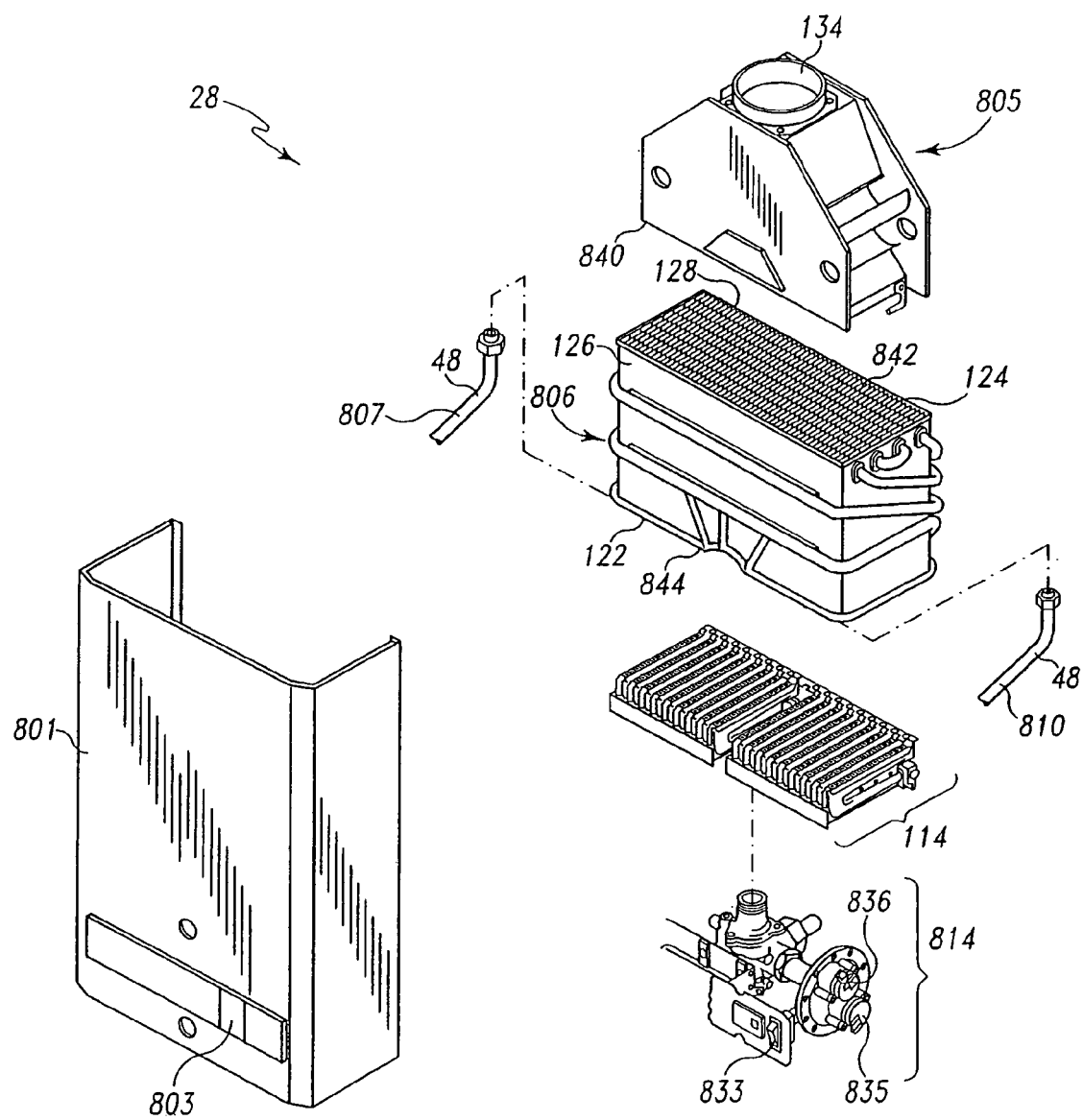
FIG. 2 illustrates internal components of an illustrative heater for use with the decontamination apparatus of FIG. 1.

As shown in FIGS. 1 and 2, a portion of hot fluid line 48 passes adjacent heater 28 to receive heat generated by heater 28 and heat the fluid flowing through hot fluid line 48. Illustratively, hot fluid line 48 is constructed of a copper alloy; however, use of other suitable materials are within the scope of this disclosure. For example, steel, aluminum, brass, stainless steel, and other alloys or materials that have desirable characteristics such as adequate strength, durability, corrosion resistance, and high heat transfer rates, and are suitable in particular applications.

As shown in FIG. 2, illustrative heater 28 includes a heat exchange chamber 806 through which hot fluid line 48 passes with cool fluid entering through portion 810 of hot fluid line 48 and exiting through portion 807. Illustrative heat exchange chamber 806 is sized to receive burner 114 in its base region 122. Heat exchange chamber 806 is illustratively rectangular in shape and has a plurality of fins 124 extending from a first side wall 126 to a second, opposite side wall 128. As shown in FIG. 1, heater 28 includes a flue 130, the bottom 132 of which is sized to approximate the size of top 134 of draught diverter 805, the bottom 840 of which is coupled to the top 842 of heat exchange chamber 806. Excess heat and exhaust from the combustion process passes from heat exchange chamber 806 through flue 130 and exits through top 136 of flue 130 to the atmosphere or other suitable destination. A suitable heater 28 is available in the form of a water heater model number 125 FX from Robert Bosch Corporation, Broadview, Ill., USA, although other heat exchangers are suitable, as are known in the art. An additional suitable heater is available in the form of a water heater model no. GWH 425 HNO, also from Robert Bosch Corporation.

As shown in FIGS. 1, heater 28 includes a fuel line 110 coupled to fuel tank 112. The burner 114, shown in FIG. 2, is sized to fit within the bottom 844 of heat exchanger 806 and couples to a fuel valve 814 that is configured to control the flow of fuel from fuel line 110 to burner 114. Illustratively, fuel valve 814 is responsive to a controller system 118, shown and described in more detail below with reference to FIGS. 16 and 17, or may have a manual control such as on/off switch 833, by which fuel valve 814 opens upon certain conditions to provide fuel. If on/off switch 833 is used, the switch may be accessed through opening 803 in cover 801, which fits around heat exchange chamber 806, burner 114, and fuel valve 814. Fuel is supplied via ports 835 and 836 and, illustratively, controller-system 118 and fuel valve 814 cooperate to open fuel valve 814 and ignite fuel at burner 114 when actuator 41 is actuated by a user. It is within the scope of this disclosure for a variety of types of equipment to be used instead of or in addition to controller system 118 to determine whether, for example, power or fuel to heater 28 should be increased, or whether heater 28 should be started or ignited. For example, a typical flow sensor could be incorporated to detect flow of fluid in hot fluid line 48, and when flow is detected in line 48, heater 28 is ignited. Further, a thermocouple to detect the temperature of fluid flowing through hot fluid line 48 could likewise be incorporated. If fluid was flowing through hot fluid line 48 and the thermocouple detected a temperature below a set point, heater 28 could be started or otherwise turned up. It is understood that heater 28 is illustrative, and other heater configurations are within the scope of this disclosure.

Figure 16:
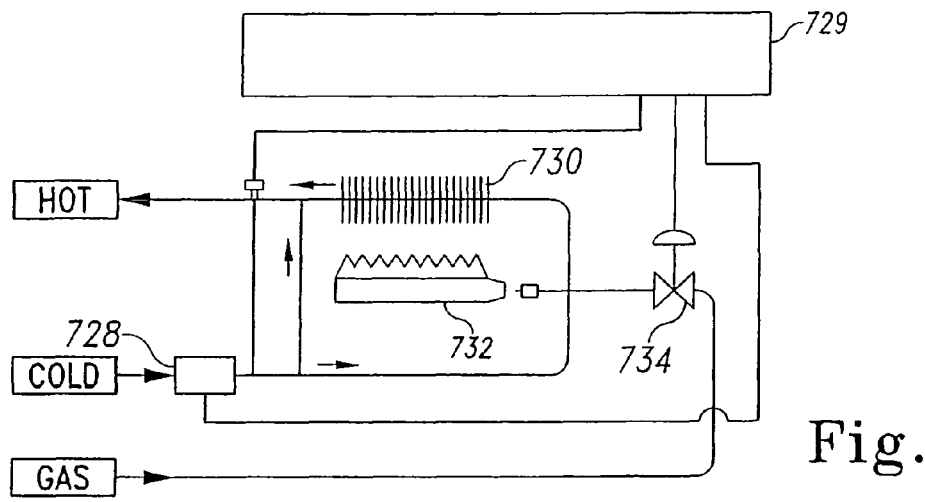
FIG. 16 is a diagrammatic view of the heater of FIG. 2, showing a computer connected to a gas proportioning valve, to a flow sensor that is also coupled to the fluid inlet to the heater, and to a thermistor that is also coupled to the hot fluid outlet line, the heat exchanger and a fuel inlet line.

As illustrated in the diagram of FIG. 16, cold fluid entering the heater passes through a valve assembly that allows gas to enter the burners only when fluid is flowing. A fluid flow sensor 728 signals computer 729 to light burner 732, and the gas is ignited in the illustrative gas-fueled example by the pilot or spark ignition. Illustratively, burners 732 activate at a flow rate of 0.75 gallons per minute (GPM), with about 0.6 gpm continuous flow required to maintain burners 732 lit. Fluid is heated as it flows through heat exchanger 730, which illustratively includes finned tube copper coils located adjacent burners 732. As the fluid flow rate changes, a governor (not shown) modulates the flow of gas to burners 732 to maintain a constant temperature. The size of the flames and the energy used is thus proportional to the volume of hot fluid being moved through the system. The fluid temperature can be adjusted, illustratively from about 100° to about 140° F., by adjusting gas proportioning valve 734.

Figure 14:
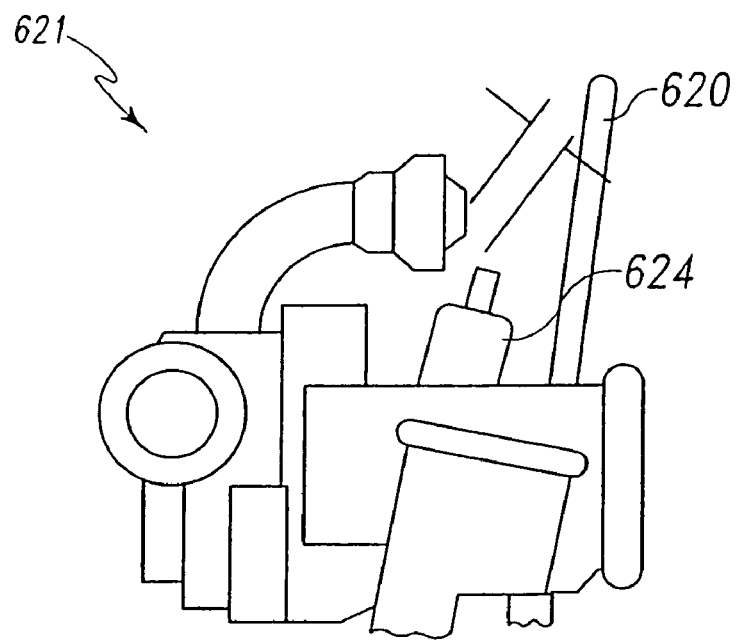
FIG. 14 is a fragmentary view of a portion of the heater of FIG. 2, showing a pilot assembly with an igniter and a flame sensor.
Figure 15:
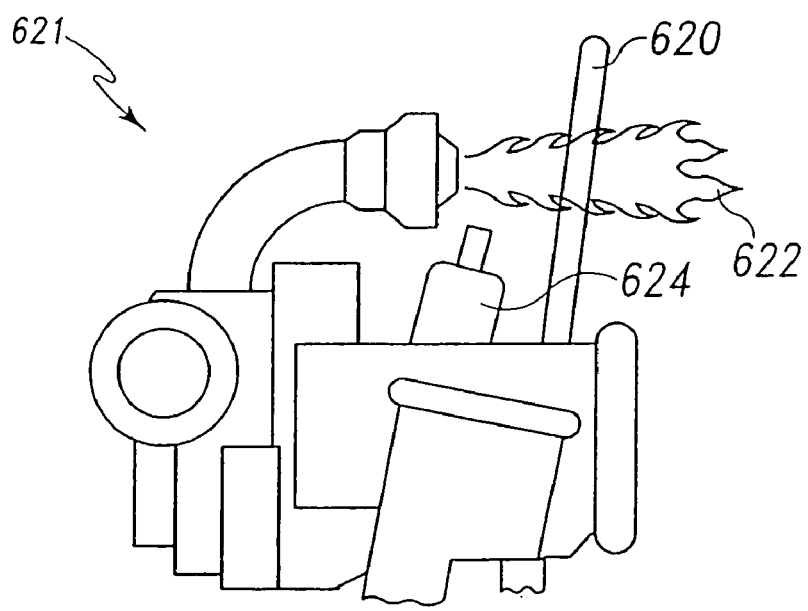
FIG. 15 is a view of the pilot assembly of FIG. 14 showing a pilot flame.
Figure 17:
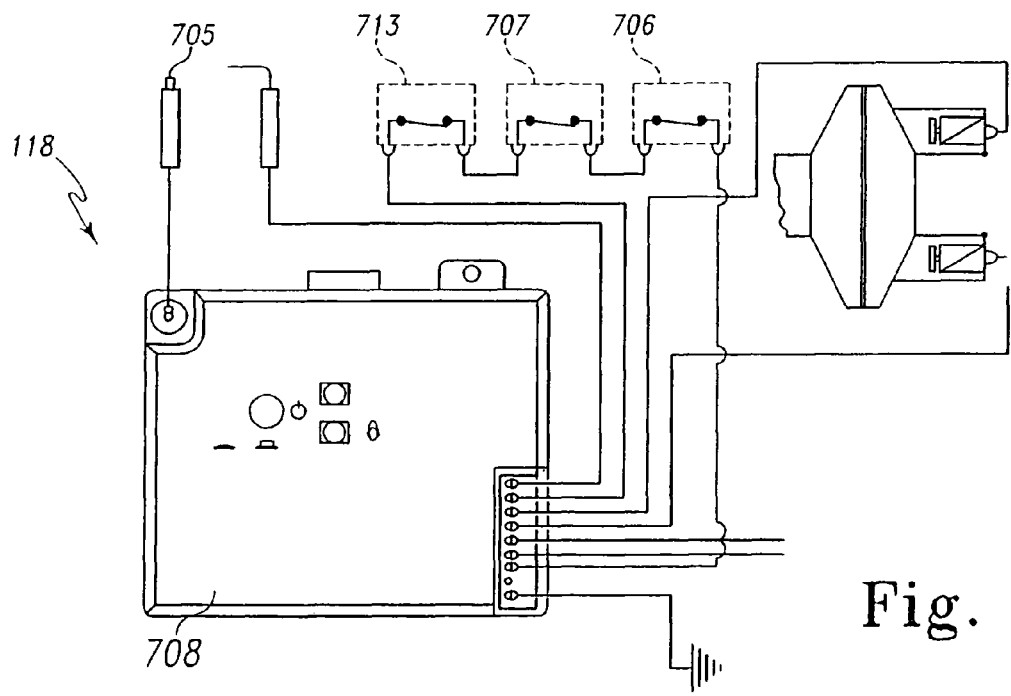
FIG. 17 is a schematic view of the heater of FIG. 2 showing safety circuitry including an overheat sensor, temperature limiter, and flue gas safety sensors and switches arranged in series and coupled to a valve to shut off flow of fuel upon detection of certain conditions.
Figure 18:
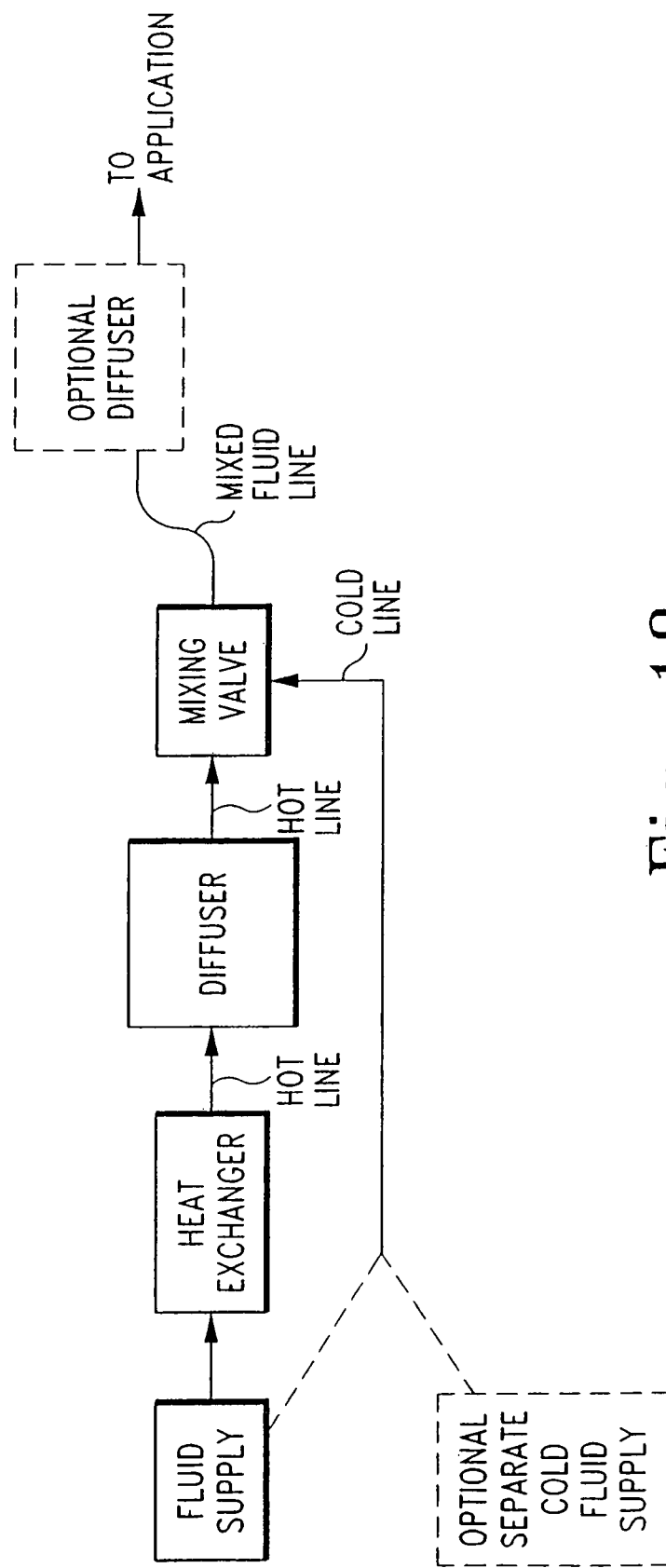
FIG. 18 is a diagrammatic view of a decontamination apparatus including a fluid supply, a heat exchanger receiving fluid from the fluid supply and feeding heated fluid to a diffuser, the diffuser feeding fluid to a mixing valve that, optionally, receives a supply of cold fluid from a cold fluid source, and a mixed fluid stream flowing from the mixing valve to an optional second diffuser then to an application.

Referring to FIGS. 14 and 15, a flame sensor 620 of heater 28 (shown in FIGS. 1 and 2) optionally may be positioned on pilot assembly 621 to sense when a flame 622 is present (FIG. 15), and to shut off the supply of gas upon failure of flame 622 (FIG. 14). As shown in FIG. 17, optionally a flue gas sensor 713, a high temperature limiter 707, and an overheat sensor 706 illustratively positioned in the flue, are coupled in series to an electronic control box 708, that controls a valve (not shown), the valve closing upon a signal from any one or more of these sensors to stop the flow of gas. Flow sensor 728, shown in FIG. 16 senses when the flow of fluid is stopped, similarly signaling to close a valve and shut off the flow of gas to the burners. Illustratively, heater 28 includes a push button piezo-electric pilot 624 shown in FIGS. 14 and 15, and as 705 in FIG. 17, safety interlocked controls, and an illustrative copper heat exchanger 730 illustrated in FIG. 16. Further, illustratively heater 28 includes a slow ignition valve, high-efficiency low-maintenance stainless steel burners 732, and filters (not shown) for the pilot and burners to provide clogging protection.

An alternative embodiment of a diffuser 230 is illustrated in FIG. 5. Diffuser 230 is illustrated as a three-pass diffuser and includes first conduit 232, a second conduit 234, and a third conduit 236. As shown in FIG. 5, first conduit 232 is positioned substantially within second conduit 234, and second conduit 234 is positioned substantially within third conduit 236. A first union 238 cooperates with first, second, and third conduits 232, 234, 236 to maintain the conduits in position. First union 238 includes a first section 240 and a second section 242. First section 240 includes a smaller diameter opening 244 sized to receive first conduit 232 therein. First section 240 includes a larger diameter opening 246 sized to receive the second conduit 234 therein. First section 240 includes a reducing or neck down region 248 between openings 244 and 246. Illustratively, reducing region 248 is frustoconical in shape. Second section 242 includes a smaller diameter opening 250 sized to receive the second conduit 234. Second section 242 includes a larger diameter opening 252 sized to receive the outside diameter of third conduit 236. Second section 242 includes a reducing or neck down region 254 between openings 250 and 252. Illustratively, reducing region 254 is frustoconical in shape. First section 240 and second section 242 of first union 238 may be provided as two separate pieces or may optionally be formed as a single first union part.

Diffuser 230 further includes a second union 256 spaced apart from first union 238. Second union 256 includes a larger diameter opening 258 sized to receive an outlet end 260 of third conduit 236. Second union 256 includes a smaller diameter opening 262 sized for coupling to a hot fluid line 264. Second union 256 includes a reducing or neck down region 266 between openings 258, 262. Illustratively, reducing region 266 is frustoconical in shape. End cap 226 has a side 227 sized to receive a second end 239 of second conduit 324.

While the reducing regions described above are shown and described as being frustoconical in shape, it is within the scope of this disclosure for one or more of the reducing regions to be other shapes. Further, although unions are described as being separate components from the conduits, it is within the scope of this disclosure to form diffusers from any number of pieces or to mold diffusers from a single piece. One of ordinary skill in the art will recognize that a wide variety of formation and/or assembly techniques may be implemented to make a diffuser.

First conduit 232 has a length F, illustratively about 53-54 inches. Second conduit 234 has a length E, illustratively about 50-51 inches. Third conduit 236 has a length D, illustratively about 48 inches. Illustratively, first, second, and third conduits 232, 234, 236 have inside diameters of about 1, 1.5, and 2.5, inches respectively. Diffuser 230 outlet configuration depicted in FIG. 5 illustrates apertures 290A through 290Q formed as holes in first conduit 232 and second conduit 234, each hole illustratively having a second corresponding hole on generally opposite sides of the conduit, formed, for example, by drilling through a first point along the length of the conduit and permitting the drilling device to penetrate through the opposite side of the conduit. While two opposite holes are described for each of apertures 290A through 290Q, such is illustrative, and any number of holes of any shape are within the scope of this invention.

The sizes and spacing of the apertures 290 are described for illustrative purposes herein. As shown, illustrative apertures 290A are 7/64 inch holes positioned in first conduit 232 about 12 inches from first end 233 of first conduit 232. apertures 290B are 3/32 inch holes positioned about 24 inches from first end 233, apertures 290C are 5/64 inch holes positioned about 36 inches from first end 233, apertures 290 Dare 1/16 inch holes positioned about 48 inches from first end 233, and apertures 290E are 1/16 inch holes positioned about 2 inches from second end 235.

Still referring to FIG. 5, illustrative apertures 290F are 9/16 inch holes positioned about 3.5 inches from first end 237 of second conduit 234 or adjacent the reducing region 254 of the second section 242 of first union 238. Illustrative apertures 290G are 9/16 inch holes positioned about 4.0 inches from first end 237 of second conduit 234, and are rotated 90 degrees around the circumference of second conduit 234 relative to apertures 290F. Illustrative apertures 290H are 9/16 inch holes positioned about 4.5 inches from first end 237 of second conduit 234, and are rotated 90 degrees around the circumference of second conduit 234 relative to apertures 290G. Illustrative apertures 290I are 9/16 inch holes positioned about 5.0 inches from first end 237 of second conduit 234, and are rotated 90 degrees around the circumference of second conduit 234 relative to apertures 290H. Illustrative apertures 290J are 9/16 inch holes positioned about 5.5 inches from first end 237 of second conduit 234, and are rotated 90 degrees around the circumference of second conduit 234 relative to apertures 290L. Illustrative apertures 290K are 9/16 inch holes positioned about 6.0 inches from first end 237 of second conduit 234, and are rotated 90 degrees around the circumference of second conduit 234 relative to apertures 290J. Illustrative apertures 290L are 9/16 inch holes positioned about 6.5 inches from first end 237 of second conduit 234, and are rotated 90 degrees around the circumference of second conduit 234 relative to apertures 290K. Illustrative apertures 290M are 9/16 inch holes positioned about 7.0 inches from first end 237 of second conduit 234, and are rotated 90 degrees around the circumference of second conduit 234 relative to apertures 290L. Illustrative apertures 290N are 3/32 inch holes positioned about 38.0 inches from second end 239 of second conduit 234. Illustrative apertures 290P are 3/32 inch holes positioned about 20.0 inches from second end 239 of second conduit 234. Illustrative apertures 290Q are 3/32 inch holes positioned about 20.0 inches from second end 239 of second conduit 234.

It is understood that fluid entering diffuser 230 at first end 233 of first conduit 232 flows upward to end cap 226, then flows downward between first conduit 232 and second conduit 234, down to aperture 290F, and then flows upward again between second conduit 234 and third conduit 236, up to and out through hot fluid line 264. As fluid flows past each of the apertures 290A through 290Q, newly heated fluid may flow through the apertures to mix with stagnant water that may already be in diffuser 230.

An alternative heater embodiment, heater 328, is depicted in FIG. 3. Heater 328 is a standard "residential" water heater, illustratively a 119 gallon water heater including a fuel line 310 coupled to fuel tank 312 and burner 314. A fuel valve (not shown) may be coupled to fuel line 310 to control flow of fuel to burner 314, and may be responsive to a controller (not shown) to provide fuel when the controller senses that additional heat is to be supplied to increase the temperature of fluid stored in heater 328. Many fuels may be used, for example natural gas, propane, or other suitable fuel types. In addition, more than one fuel tank 312 may be used at the same time to provide more fuel to burner 314 than one fuel tank 312 could provide alone. One of ordinary skill in the art will appreciate that an electric water heater could be used for illustrative heater 328.

Heater 328 further includes a storage tank 302 in which fluid is stored that enters storage tank 302 through a fluid inlet line 340. As shown in FIG. 3, a heat exchange region 321 includes an interface 323 adjacent burner 314. Interface 323 may take a number of forms, and may include a circuit through which hot combustion gases flow such as a coil, a generally flat surface, or a heat sink extending into fluid stored in storage tank 320 to increase the surface area of interface 323 in contact with fluid in storage tank 320. If heater 328 is an electric heater, an electric element electrically coupled to an electric source could heat the fluid in storage tank 320. Optionally, a filter 347 may be provided, illustratively in fluid inlet line 340, to filter out particulate matter. Filters may be provided elsewhere in the system, illustratively in cold fluid line 346.

As shown in FIG. 3, a mixing valve 326 receives hot fluid from hot fluid line 348 and cold fluid from cold fluid line 346. As with the embodiment described with reference to FIG. 1, mixing valve 326 mixes hot and cold fluids and supplies tempered water through mixed fluid line 350. A diffuser, illustratively diffuser 230 of FIG. 5, is coupled to hot fluid inlet line 348 and is between mixing valve 326 and the fluid outlet from heater 328. An illustrative mixing valve is disclosed in U.S. Pat. No. 5,647,531 assigned to Lawler Manufacturing Company, Inc. of Indianapolis, Ind., the disclosure of which is hereby incorporated by reference herein. Other mixing valves of various configurations may be used depending on the specific requirements of the application in which the subject matter hereof is incorporated.

Figure 24:
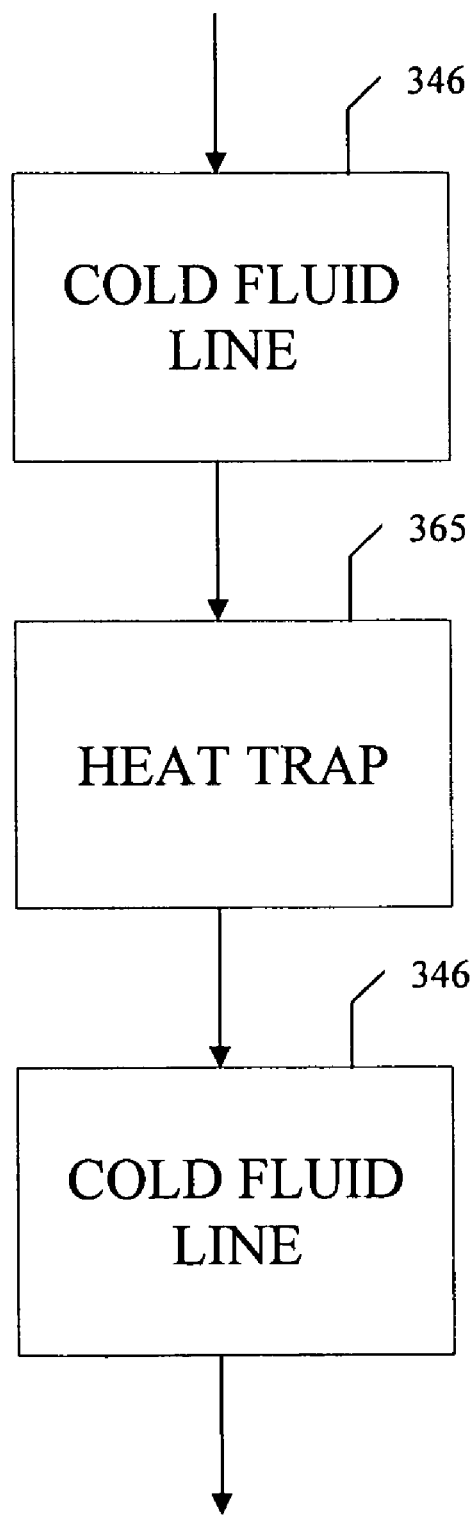
FIG. 24 is a diagrammatic view of a portion of a decontamination apparatus showing the location of a heat trap positioned within a cold fluid line.

In an embodiment of decontamination apparatus 320 shown in FIG. 24, a heat trap 365 may be positioned within cold fluid line 346. The arrows in FIG. 24 represent the directions of fluid flow. Heat trap 365 may operate to prevent or reduce thermosyphoning (energy losses) of hot water from heater 328 during periods of no active fluid flow. In an exemplary embodiment, heat trap 365 is a portion of copper conduit positioned within cold fluid line 346 as an inverted "U" shape, wherein a horizontal portion of cold fluid line 346 curves upwards, curves back to a horizontal position in the same or substantially similar direction as the initial horizontal direction, curves downwards parallel or substantially parallel to the initial upward direction, and then curves back to a horizontal position in the same or substantially similar direction as the prior horizontal direction, forming an inverted "U" shaped heat trap 365. It is within the scope of this disclosure to use other heat trap means or systems as are known in the art to reduce energy losses of hot water during periods of no active fluid flow.

It is within the scope of this embodiment that one or more pressure reducing valves 63 may be positioned either directly adjacent to mixing valve 26 or prior to an inlet of mixing valve within cold fluid line 46 and/or cold fluid line 48.

A restrictor 349 (internal location as shown in FIGS. 3 and 21), may be positioned between the junction of cold fluid line 346 and cold inlet of mixing valve 326. Restrictor 349 may also define one or more holes. In one embodiment, restrictor 349 may be comprised of copper, be circular in shape, 1¼" in diameter, $^{10}/_{1000}$" ($^{1}/_{100}$") thick, and define a hole $^{3}/_{16}$" in diameter. Restrictor 349 may be comprised of metal, plastic, glass, or other suitable materials, may be sized and shaped with diameters and thicknesses suitable for the particular application, and may define one or more holes of varying diameters. Restrictor 349 operates to equalize differentials in pressure between cold fluid line 346 and hot fluid line 348 from heater 328 to mixing valve 326. Restrictor 349 is therefore beneficial by equalizing pressures of cold fluid line 346 and hot fluid line 348 entering mixing valve 326 to stop mixing valve 326 from going into bypass, allowing only cold fluid from cold fluid line 346 to flow through mixing valve 326. Accordingly, if fluid pressure is zero or too low from the hot fluid line 348, the mixing valve 326 may revert to bypass blocking off the hot fluid from the hot fluid line 348, allowing only cold fluid from the cold fluid line 346 to flow through the mixing valve 326. If fluid pressure is zero or too low from the cold fluid line 346, mixing valve 326 may revert to bypass blocking off the flow of cold fluid from the cold fluid line 346 and hot fluid from the hot fluid line 48, preventing all fluid flow through the mixing valve 326 so that hot fluid is not permitted to flow and perhaps injure the user. Additionally, if fluid pressure is too high from cold fluid line 346, mixing valve 326 may only sense cold fluid and may revert to bypass blocking off the hot fluid from hot fluid line 348. Restrictor 349, when positioned between cold inlet of mixing valve 26, would act in this latter fashion to prevent bypass by decreasing the pressure of the cold fluid from cold fluid line 346. It is within the scope of this embodiment that a restrictor 349 may also be positioned between the junction of cold fluid line 346 and cold inlet of mixing valve 326, with or without a restrictor 349 being positioned between the junction of hot fluid line 348 and mixing valve 326.

While reference is made to restrictor 349, it is within the scope of this disclosure to use other means or systems as are known in the art to reduce the pressure of fluid flow through a conduit, such as pressure reducing valves and the like. For example, as shown in FIG. 22, pressure reducing valve 63 may be positioned within cold fluid line 346 prior to mixing valve 326. Pressure reducing valve 63 may operate to equalize differentials in pressure between cold fluid from cold fluid line 346 and hot fluid from hot fluid line 348 to mixing valve 326 by restricting the pressure of cold fluid from cold fluid line 346.

An additional embodiment, as shown in FIG. 23, demonstrates an embodiment utilizing multiple pressure reducing valves. In this embodiment, pressure reducing valves 63 may be positioned within cold fluid line 346 prior to mixing valve 326 and may also be positioned within hot fluid line 348 prior to mixing valve 326. Pressure reducing valves 63 may operate to equalize differentials in pressure between cold fluid from cold fluid line 346 and hot fluid from hot fluid line 348 to mixing valve 326 by restricting the pressure of cold fluid from cold fluid line 346 and the pressure of hot fluid from hot fluid line 348. It is within the scope of this embodiment that one or more pressure reducing valves 63 may be positioned either directly adjacent to mixing valve 326 or prior to an inlet of mixing valve within cold fluid line 346 and/or cold fluid line 348.

Figure 25:
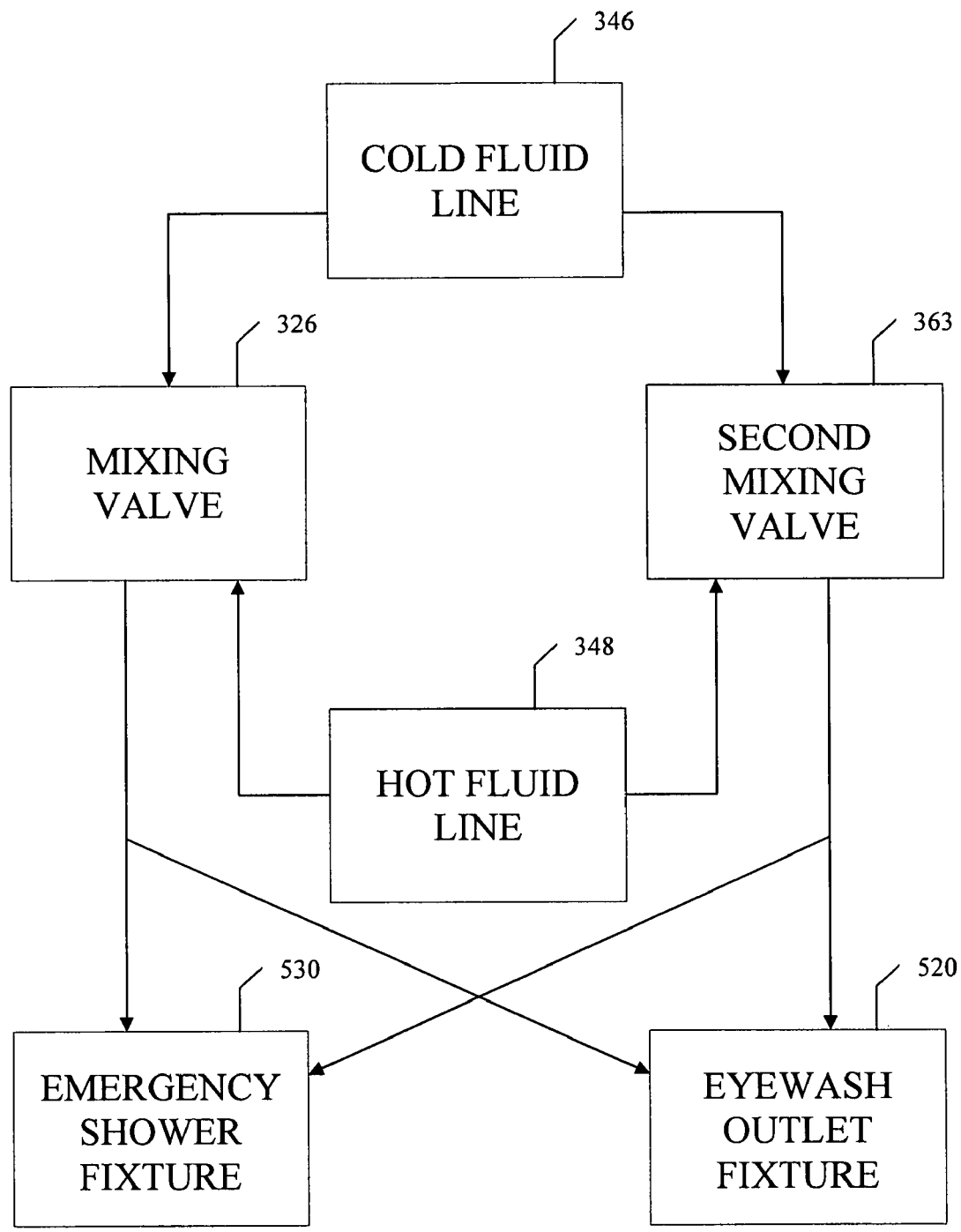
FIG. 25 is a diagrammatic view of aspects of an embodiment of a decontamination apparatus showing the location of a mixing valve and a second mixing valve positioned within a circulation network.

Aspects of an additional embodiment of decontamination apparatus 320 are shown in FIG. 25. The arrows in FIG. 25 represent the directions of fluid flow. In this embodiment, cold fluid from cold fluid line 346 may flow to mixing valve 326 and/or to a second mixing valve 363. Hot fluid from hot fluid line 348 may also flow to mixing valve 326 and/or to second mixing valve 363. Mixed fluid may then flow from mixing valve 326 and/or second mixing valve 363 to emergency fixture 510 such as eyewash outlet fixture 520 and/or emergency shower fixture 530. In this embodiment, if eyewash outlet fixture 520 is activated by a user, cold fluid from cold fluid line 346 and hot fluid from hot fluid line 348 may mix in mixing valve 326 and second mixing valve 363 and flow to eyewash outlet fixture 520. Additionally, if emergency shower fixture 530 is activated by a user, cold fluid from cold fluid line 346 and hot fluid from hot fluid line 348 may mix in mixing valve 326 and second mixing valve 363 and flow to emergency shower fixture 530. Second mixing valve 363 may predominantly supply mixed fluid to eyewash outlet fixture 520, and therefore when eyewash outlet fixture 520 is activated (the emergency fixture 510 that has a relatively low fluid flow requirement), second mixing valve 363 may provide mixed fluid to eyewash outlet fixture 520. It is understood in this additional embodiment that cold fluid from cold fluid line 346 and hot fluid from hot fluid line 348 may mix in one or both mixing valve 326 and second mixing valve 363 under all conditions of fluid flow out of an emergency fixture 510. A preferred second mixing valve 363 is model no. 911EF, manufactured by Lawler Manufacturing Company, Inc.

Still referring to FIG. 3, when a user actuates actuator 521, 526, or 532, opening a valve 522, 534, mixed fluid flows from mixed fluid outlet of the mixing valve and through mixed fluid line 350, toward fixture 510.

Figure 6:
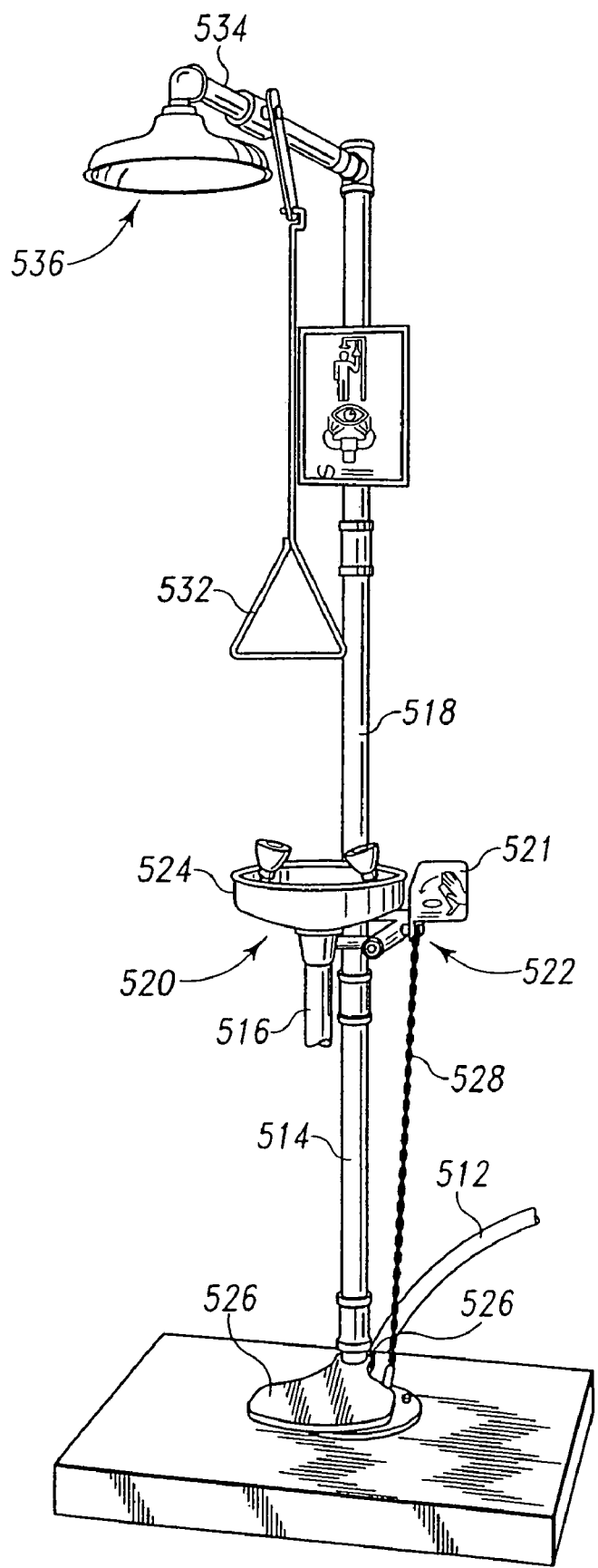
FIG. 6 is a perspective view of a decontamination fixture including a drench shower and an eyewash station.

As shown in FIGS. 3 and 6, a combination emergency fixture 510 is illustrated. Emergency fixture 510 includes a tempered fluid inlet 512 receiving tempered water from a source such as the system shown in FIG. 3. Emergency fixture 510 includes a fluid supply line 514 coupled to fluid inlet 512, the fluid supply line being coupled to an eyewash supply line 516 and a emergency shower supply line 518. Eyewash supply line 516 is coupled to an eyewash outlet fixture 520 so that, when eyewash actuator 521 and valve 522 is actuated, fluid flows from fluid inlet 512 through fluid supply line 514, into eyewash supply line 516, and out eyewash outlet fixture 520. Basin 524 is provided to catch at least part of the refuse fluid and divert the discarded fluid into a drain line 525. An optional foot actuator 526 is coupled with a link 528 to valve 522 so that a user can actuate the eyewash by stepping on foot actuator 526. Combination emergency fixture 510 further includes an emergency shower fixture 530 coupled to the emergency shower supply line 518. A shower actuator 532 is operably coupled to a valve 534 so that when a user actuates shower actuator 532, tempered fluid flows from fluid inlet 512 through fluid supply line 514, into emergency shower supply line 518, and out emergency shower fixture outlet 536.

It is within the scope of this disclosure for heaters 28, 328 to be replaced with another suitable heating device, for example a shell and tube heat exchanger—having a heating fluid flowing therethrough (when access is had to such a heating fluid possessing sufficient heat to raise the temperature of supplied fluid by an acceptable amount).

Diffusers 30, 230 are illustratively constructed using a copper alloy. In these examples, copper is selected because of its high heat transfer rate, and resultant ability to dissipate heat contained in fluid flowing through diffusers 30, 230. However, one of ordinary skill in the art will recognize that many other materials could be used that provide desirable properties such as machinability, durability, corrosion resistance, compatibility with other system materials, cost, and the like.

Figure 7:
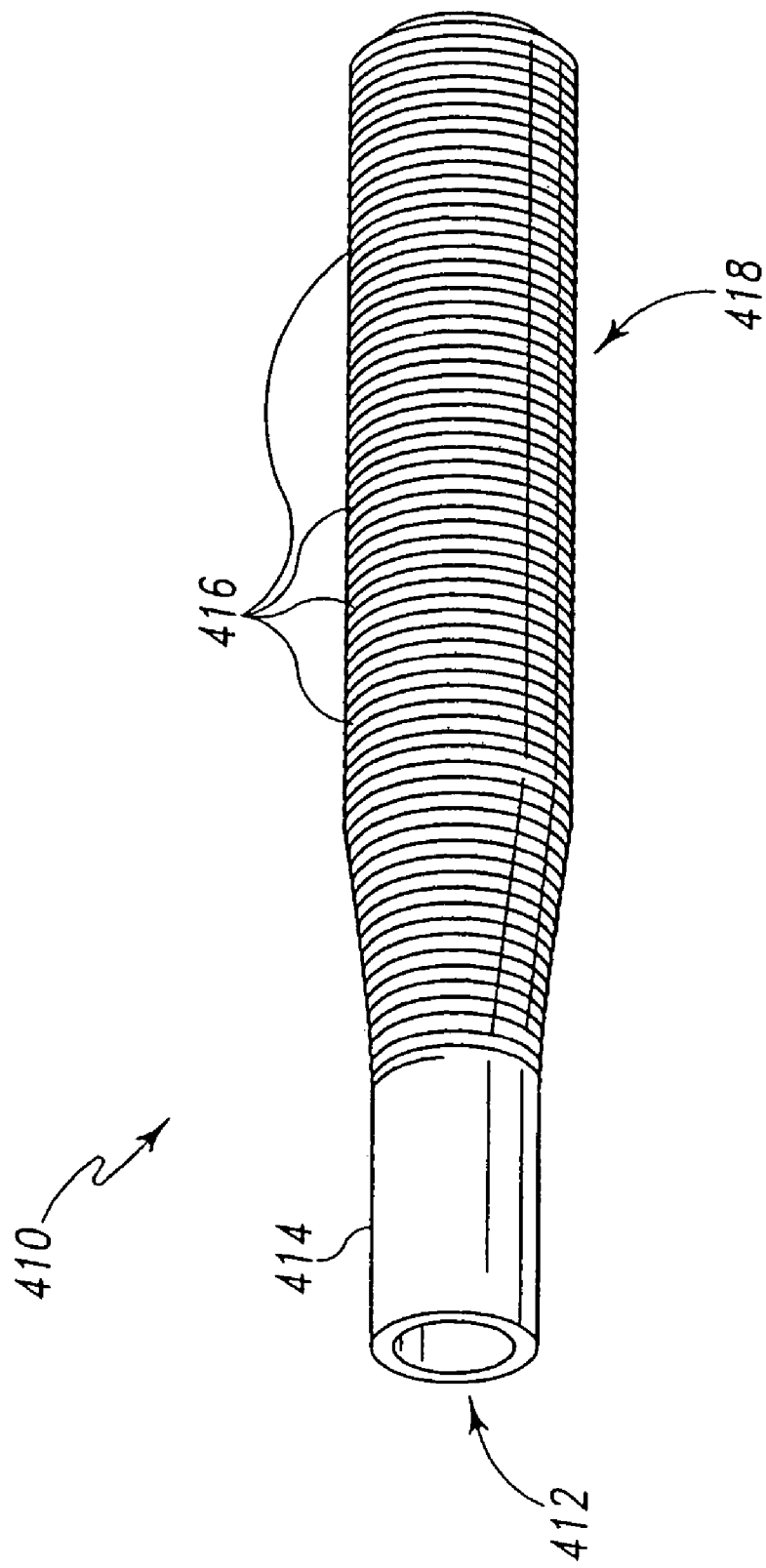
FIG. 7 is a perspective view of a conduit for a diffuser having a spiral fin projecting away from the centerline through the conduit.

In a further illustrative embodiment represented in FIG. 7, a conduit 410 is depicted. Conduit 410 may serve as the inner conduit of a diffuser, the outer conduit, or a conduit between the outer and inner conduit in a three (or more) pass diffuser. Conduit 410 includes an internal passageway 412 and an external surface 414. As shown in FIG. 7, external surface 414 includes a plurality of fins 416. Fins 416 are actually shown as a single spiral fin created using an extrusion process in which a thick-walled, illustratively copper alloy, tube is extruded to form fins 416 from surface 414. An integral finned surface 418 is thus formed on conduit 410. Fins 416 increase the surface area of external surface 414 and thus increase heat transfer into adjacent matter such as fluid flowing outside of conduit 410. It is within the scope of this disclosure to include a separate finned surface 418 constructed from a different piece of material than conduit 410 and connect separate finned surface 418 to conduit 410 to permit heat transfer during operation from conduit 410 into separate finned surface 418. It is within the scope of this disclosure to form fins 416 independently instead of as a single, spiral fin. Conduit 410 could serve as an external conduit, middle conduit (such as in a three-pass diffuser configuration) or an inner conduit. A finned conduit may be used instead of or in addition to a conduit with plurality of apertures, or, alternatively, the finned conduit may be provided with one or more apertures, to provide additional mixing.

Referring now to FIGS. 8 through 13, various aperture configurations are depicted for the apertures provided in the diffusers. These aperture configurations are provided on the internal conduits—in other words, depending on the number of passes fluid makes through a particular diffuse line, all conduits except for the outermost conduit may, or may not, include such aperture configurations. Any number of passes may be made through a diffuser, however consideration of physical, practical, and cost factors suggest that diminishing returns exist beyond a maximum number of passes. However, this maximum number of passes may vary depending on such factors as system size, pressure, and flow rate, for example. Generally, a higher number of passes should improve mixing between a first mass of fluid and a second mass of fluid adjacent the first mass upon entry into the diffuser. Further, a higher number of passes should improve heat transfer between such a first and second fluid mass, from the fluid mass(es) and to the diffuser material.

Figure 8:
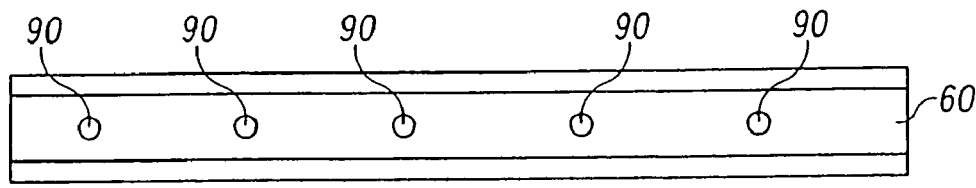
FIG. 8 is a cross-sectional view of a conduit for a diffuser having a plurality of holes formed therein.

FIG. 8 shows a plurality of apertures 90 evenly spaced along the length of conduit 60. FIG. 13 similarly shows a plurality of apertures 690A through 690E. However, apertures 690A through 690E are depicted as not evenly spaced. For example, Apertures 690D and 690E are more closely spaced than apertures 690A and 690B, and illustratively the spacing gradually decreases from 690A to 690E. A combination arrangement is shown in FIG. 4, with spacing gradually decreasing in first half 92 from aperture 90A to aperture 90D, and the spacing remaining essentially consistent between apertures in second half 94, from aperture 90D to aperture 90K. Apertures 95-98 in FIGS. 9-12 depict a variety of illustrative shapes including rhomboid, ovoid, rectangular, and parallelogram shapes. However, it is understood that these shapes are illustrative only, and that other shapes, including irregular shapes, may be included and are within the scope of this disclosure. Additionally, any shape aperture may be used with any aperture spacing to achieve the desired mixing effect of fluid in the conduit.

Figure 9:
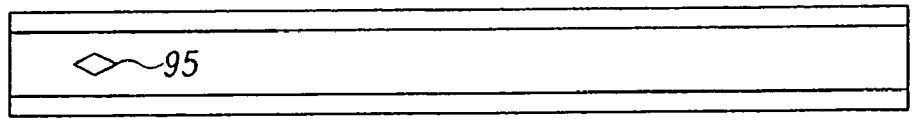
FIG. 9 is a cross-sectional view of a conduit for a diffuser similar to FIG. 8 showing a hole having a diamond shape.
Figure 10:
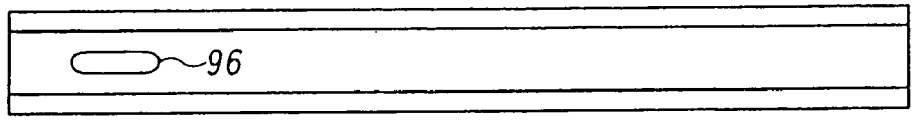
FIG. 10 is a cross-sectional view of a conduit for a diffuser similar to FIG. 8 showing a hole having an oval shape.
Figure 11:
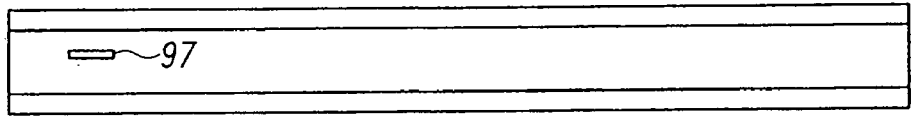
FIG. 11 is a cross-sectional view of a conduit for a diffuser similar to FIG. 8 showing a slot having a elongated rectangular shape.
Figure 12:
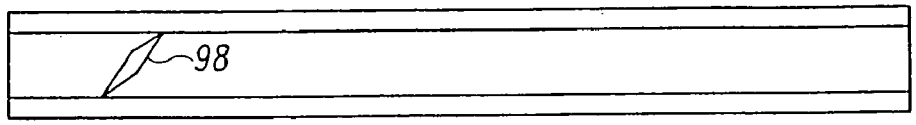
FIG. 12 is a cross-sectional view of a conduit for a diffuser similar to FIG. 8 showing a hole having a trapezoidal shape.
Figure 13:
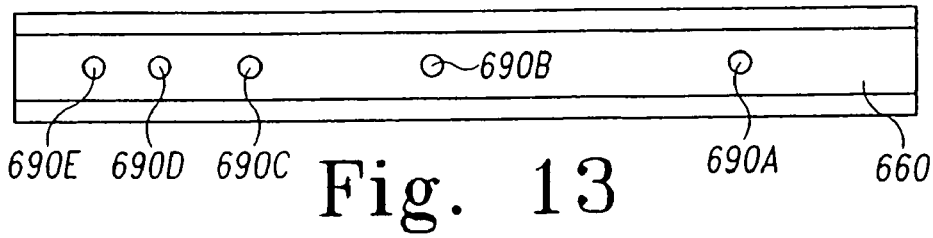
FIG. 13 is a cross-sectional view of a conduit for a diffuser similar to FIG. 8 showing a plurality of circular holes spaced apart by varying distances.

FIG. 8 illustrates substantially circular holes, FIG. 9 illustrates a substantially diamond (rhomboid) aperture, FIG. 10 illustrates a substantially oval aperture, FIG. 11 illustrates a substantially rectangular aperture, FIG. 12 illustrates an angularly-oriented parallelogram-shaped aperture, and FIG. 13 illustrates a series of apertures positioned at points A, B, C, D, and E along conduit 660.

Diffusers 30, 230 may also serve as heat sinks. The heat sink is a thermally conductive structure that has a mass per unit of linear length of net fluid flow greater than the average mass per unit of linear length of net fluid flow in the overall fluid flow network. Illustratively, the heat sink comprises copper. In one exemplary configuration, the heat sink surrounds a first fluid conduit such as conduits 60, 232 of FIGS. 4 and 5, so that fluid flowing from the first fluid conduit subsequently flows through a passageway defined by or otherwise through the heat sink. Further, while the diffusers illustrated herein are used in conjunction with portable emergency fixtures, it is understood that the diffusers may be used with any fixture for which temperature control is desired. Such fixtures include fixed stationary emergency fixtures, as well as sinks, showers, and any other fluid fixture. The diffusers illustrated herein may also be used in combination with hot water heaters, for whatever purpose, wherein the diffuser would be installed in the hot water line exiting from the hot water heater. Other applications for the diffusers are possible.

The following chart contains data from a test performed using a diffuser similar to the diffuser shown in FIG. 3:

EXAMPLE 1

TABLE 1

| Time | Temperature (° F.) of Cold Water | Temperature (° F.) of Hot Water | Temperature (° F.) of Mixed Water | Pressure of hot water at mixing point |
|---|---|---|---|---|
| 3:00:42 PM | 43.4509 | 171.7 | 84.6336 | 1.92 |
| 3:00:52 PM | 43.3573 | 171.924 | 84.8198 | 3.02 |

TABLE 1-continued

| Time | Temperature (° F.) of Cold Water | Temperature (° F.) of Hot Water | Temperature (° F.) of Mixed Water | Pressure of hot water at mixing point |
|---|---|---|---|---|
| 3:01:02 PM | 43.3417 | 172.67 | 85.6164 | 6.55 |
| 3:01:12 PM | 43.4275 | 173.252 | 144.085 | 6.40 |
| 3:01:22 PM | 43.4119 | 173.739 | 165.607 | 7.14 |
| 3:01:32 PM | 43.4275 | 174.084 | 169.902 | 6.42 |
| 3:01:42 PM | 43.4509 | 174.396 | 171.483 | 7.07 |
| 3:01:52 PM | 43.5757 | 174.592 | 171.985 | 6.91 |
| 3:02:02 PM | 44.0981 | 174.896 | 172.683 | 6.65 |
| 3:02:12 PM | 45.1031 | 175.031 | 172.92 | 6.81 |
| 3:02:22 PM | 46.2003 | 175.024 | 173.34 | 7.12 |
| 3:02:32 PM | 47.0322 | 175.207 | 173.489 | 7.12 |
| 3:02:42 PM | 47.7779 | 175.274 | 173.638 | 7.11 |
| 3:02:52 PM | 48.3911 | 175.301 | 173.807 | 6.98 |
| 3:03:02 PM | 45.5001 | 175.288 | 173.699 | 3.03 |
| 3:03:12 PM | 44.2462 | 175.031 | 121.81 | 2.32 |
| 3:03:22 PM | 44.1292 | 174.592 | 95.1776 | 1.99 |
| 3:03:32 PM | 43.9032 | 174.497 | 91.0316 | 2.85 |
| 3:03:42 PM | 43.9655 | 174.166 | 89.2846 | 3.01 |
| 3:03:52 PM | 44.1994 | 173.936 | 88.4988 | 1.58 |
| 3:04:02 PM | 43.7784 | 173.821 | 87.9795 | 2.06 |
| 3:04:13 PM | 43.5133 | 173.631 | 87.8607 | 2.73 |
| 3:04:23 PM | 43.3495 | 173.577 | 87.6083 | 1.67 |
| 3:04:33 PM | 43.2715 | 173.36 | 83.1573 | 1.27 |
| 3:04:43 PM | 43.1544 | 173.266 | 81.656 | 1.91 |
| 3:04:53 PM | 43.131 | 173.184 | 81.2523 | 1.39 |
| 3:05:03 PM | 43.0842 | 173.089 | 81.1551 | 2.66 |
| 3:05:13 PM | 43.0452 | 173.029 | 80.9755 | 2.32 |
| 3:05:23 PM | 42.9437 | 172.981 | 80.9306 | 0.05 |
| 3:05:33 PM | 42.9906 | 172.758 | 81.1326 | 0.03 |
| 3:05:43 PM | 43.014 | 172.649 | 81.3495 | 0.03 |
| 3:05:53 PM | 43.014 | 172.52 | 82.1269 | 0.03 |
| 3:07:30 PM | 45.8493 | 170.537 | 84.7979 | 0.03 |
| 3:07:32 PM | 45.966 | 170.537 | 84.7979 | 0.03 |
| 3:07:35 PM | 46.0516 | 170.496 | 84.783 | 0.03 |
| 3:11:16 PM | 45.6476 | 164.755 | 89.4627 | 0.03 |
| 3:11:26 PM | 45.7643 | 164.618 | 89.3071 | 0.03 |
| 3:11:36 PM | 45.7176 | 164.434 | 89.1515 | 0.03 |
| 3:11:46 PM | 45.7487 | 164.243 | 89.0329 | 0.03 |
| 3:11:56 PM | 45.9277 | 165.308 | 97.7428 | 6.52 |
| 3:12:06 PM | 47.0629 | 166.746 | 148.545 | 6.84 |
| 3:12:16 PM | 47.3194 | 168.571 | 159.367 | 6.98 |
| 3:12:26 PM | 47.2727 | 170.29 | 162.992 | 6.92 |
| 3:12:36 PM | 47.3349 | 170.752 | 165.43 | 5.59 |
| 3:12:46 PM | 46.2389 | 170.847 | 159.882 | 2.24 |
| 3:12:56 PM | 46.0678 | 170.989 | 106.999 | 3.43 |
| 3:13:06 PM | 46.06 | 171.111 | 99.4216 | 3.38 |
| 3:13:16 PM | 45.8733 | 171.478 | 97.6253 | 2.34 |
| 3:13:26 PM | 45.492 | 171.762 | 93.4761 | 2.47 |
| 3:13:36 PM | 45.0872 | 172.068 | 92.192 | 2.40 |
| 3:13:46 PM | 44.5108 | 172.244 | 91.8522 | 2.85 |
| 3:13:56 PM | 44.1991 | 172.461 | 91.5567 | 1.63 |
| 3:14:06 PM | 43.934 | 172.616 | 91.2092 | 2.70 |
| 3:14:16 PM | 43.8405 | 172.691 | 91.1279 | 3.16 |
| 3:14:26 PM | 43.7859 | 172.766 | 91.0466 | 1.84 |
| 3:14:36 PM | 43.7079 | 172.874 | 88.8771 | 3.14 |
| 3:14:46 PM | 43.7157 | 172.942 | 88.5583 | 2.85 |
| 3:14:56 PM | 43.6767 | 172.921 | 88.3432 | 2.49 |
| 3:15:06 PM | 43.6303 | 172.981 | 88.343 | 2.31 |
| 3:15:16 PM | 43.5835 | 172.893 | 88.573 | 2.65 |
| 3:15:26 PM | 43.5211 | 172.873 | 88.573 | 1.64 |
| 3:15:36 PM | 43.4197 | 172.866 | 88.5136 | 3.12 |
| 3:15:46 PM | 43.3417 | 172.839 | 88.0759 | 2.40 |
| 3:15:56 PM | 43.2559 | 172.656 | 76.8887 | 2.40 |
| 3:16:06 PM | 43.209 | 172.534 | 76.9037 | 1.41 |
| 3:16:16 PM | 43.2012 | 172.5 | 80.2271 | 0.03 |
| 3:16:26 PM | 43.209 | 172.331 | 80.1597 | 1.91 |
| 3:16:36 PM | 43.2246 | 172.737 | 91.7855 | 7.00 |
| 3:16:46 PM | 43.2246 | 173.238 | 157.181 | 7.02 |
| 3:16:56 PM | 43.2246 | 173.672 | 168.195 | 6.79 |
| 3:17:06 PM | 43.2402 | 173.956 | 170.493 | 6.81 |
| 3:17:16 PM | 43.2559 | 174.301 | 171.585 | 6.93 |
| 3:17:26 PM | 43.2793 | 174.423 | 172.222 | 6.69 |
| 3:17:37 PM | 43.3105 | 174.653 | 172.859 | 6.98 |
| 3:17:47 PM | 43.3963 | 174.72 | 171.266 | 0.03 |
| 3:17:57 PM | 43.6069 | 174.639 | 170.88 | 0.03 |
| 3:18:07 PM | 43.9804 | 174.581 | 170.149 | 0.03 |
| 3:18:17 PM | 44.6039 | 173.552 | 170.522 | 1.87 |
| 3:18:27 PM | 44.1987 | 173.187 | 116.597 | 3.45 |
| 3:18:37 PM | 44.1753 | 173.816 | 105 | 4.21 |
| 3:18:47 PM | 44.2299 | 173.776 | 107.761 | 6.24 |
| 3:18:57 PM | 44.2299 | 173.952 | 142.44 | 5.79 |
| 3:19:07 PM | 44.1831 | 174.08 | 158.029 | 5.79 |
| 3:19:17 PM | 44.261 | 174.33 | 160.143 | 5.79 |
| 3:19:27 PM | 44.339 | 174.303 | 154.455 | 5.66 |
| 3:19:37 PM | 44.3623 | 174.249 | 150.432 | 5.59 |
| 3:19:47 PM | 44.3857 | 174.445 | 149.94 | 5.84 |
| 3:19:57 PM | 44.5805 | 174.398 | 148.83 | 0.03 |
| 3:20:07 PM | 44.6221 | 174.299 | 118.859 | 0.03 |
| 3:20:17 PM | 44.2714 | 174.218 | 71.4021 | 0.03 |
| 3:20:27 PM | 44.1389 | 173.541 | 61.8197 | 0.03 |
| 3:20:37 PM | 43.9804 | 172.353 | 65.3808 | 0.03 |
| 3:20:47 PM | 43.9596 | 172.823 | 75.4319 | 0.45 |
| 3:20:57 PM | 43.8511 | 173.112 | 81.5016 | 4.65 |
| 3:21:07 PM | 43.8667 | 173.343 | 88.7164 | 5.76 |
| 3:21:17 PM | 43.8511 | 173.674 | 138.142 | 5.57 |
| 3:21:27 PM | 43.8433 | 173.959 | 146.358 | 5.96 |
| 3:21:37 PM | 43.8667 | 174.182 | 149.282 | 5.31 |
| 3:21:47 PM | 43.8979 | 174.5 | 150.273 | 5.76 |
| 3:21:57 PM | 43.9758 | 174.561 | 150.717 | 6.08 |
| 3:22:07 PM | 43.9836 | 174.466 | 151.014 | 5.63 |
| 3:22:17 PM | 44.0304 | 174.594 | 151.346 | 4.22 |
| 3:22:27 PM | 44.0772 | 174.635 | 139.776 | 3.73 |
| 3:22:37 PM | 44.0694 | 174.703 | 124.316 | 4.40 |
| 3:22:47 PM | 44.0304 | 174.79 | 124.216 | 4.73 |
| 3:22:57 PM | 43.9914 | 174.703 | 126.607 | 4.47 |
| 3:23:07 PM | 43.9914 | 174.689 | 126.919 | 4.56 |
| 3:23:17 PM | 44.007 | 174.689 | 127.792 | 4.28 |
| 3:23:27 PM | 44.0304 | 174.676 | 130.123 | 4.98 |
| 3:23:37 PM | 44.007 | 174.723 | 131.121 | 4.50 |
| 3:23:47 PM | 44.0304 | 174.696 | 132.166 | 5.07 |
| 3:23:57 PM | 44.0227 | 174.729 | 134.944 | 5.15 |
| 3:24:07 PM | 43.9838 | 174.675 | 135.331 | 0.03 |
| 3:24:17 PM | 43.8045 | 174.587 | 107.9 | 0.03 |
| 3:24:27 PM | 43.6485 | 174.181 | 55.0661 | 0.03 |
| 3:24:37 PM | 43.5939 | 174.235 | 47.9435 | 1.58 |
| 3:24:47 PM | 43.5159 | 172.557 | 55.5128 | 2.60 |
| 3:24:57 PM | 43.4613 | 172.855 | 74.6183 | 1.94 |
| 3:25:07 PM | 43.4223 | 173.207 | 74.5957 | 1.31 |
| 3:25:17 PM | 43.3989 | 173.098 | 74.4224 | 2.68 |
| 3:25:27 PM | 43.3911 | 172.882 | 78.4307 | 4.91 |
| 3:25:37 PM | 43.4067 | 173.173 | 110.219 | 5.20 |
| 3:25:47 PM | 43.4613 | 173.491 | 129.762 | 5.08 |
| 3:25:57 PM | 43.4691 | 173.64 | 133.013 | 5.20 |
| 3:26:07 PM | 43.5003 | 173.87 | 133.852 | 5.08 |
| 3:26:17 PM | 43.5471 | 174.127 | 134.282 | 5.31 |
| 3:26:27 PM | 43.6173 | 174.093 | 134.627 | 5.25 |
| 3:26:37 PM | 43.5939 | 174.033 | 134.951 | 5.44 |
| 3:26:47 PM | 43.5861 | 174.107 | 135.036 | 0.60 |
| 3:26:57 PM | 43.5401 | 173.962 | 98.6244 | 0.03 |
| 3:27:07 PM | 43.4387 | 173.82 | 56.8212 | 0.03 |
| 3:27:17 PM | 43.3997 | 173.482 | 48.0761 | 0.03 |
| 3:27:27 PM | 43.3451 | 173.313 | 45.628 | 0.03 |
| 3:27:38 PM | 43.2593 | 173.164 | 47.3618 | 0.03 |
| 3:27:48 PM | 43.2359 | 171.741 | 55.3284 | 0.03 |
| 3:27:58 PM | 43.2124 | 171.476 | 59.6308 | 0.03 |
| 3:28:08 PM | 43.1968 | 171.32 | 56.2213 | 0.03 |
| 3:28:18 PM | 43.1344 | 171.144 | 48.1149 | 0.03 |
| 3:28:28 PM | 43.111 | 170.981 | 44.8494 | 0.03 |
| 3:28:38 PM | 43.0564 | 170.927 | 44.0781 | 0.03 |
| 3:28:48 PM | 43.0252 | 170.757 | 43.8598 | 0.03 |
| 3:28:58 PM | 42.994 | 170.52 | 44.4911 | 0.03 |
| 3:29:08 PM | 42.955 | 170.18 | 49.4645 | 0.03 |
| 3:29:18 PM | 42.9471 | 169.895 | 50.7347 | 0.03 |
| 3:29:28 PM | 42.9003 | 169.691 | 51.0674 | 0.03 |
| 3:29:38 PM | 42.9342 | 169.374 | 51.2093 | 0.03 |
| 3:29:48 PM | 42.8938 | 169.229 | 51.1929 | 0.03 |
| 3:29:58 PM | 42.9016 | 168.963 | 51.1233 | 4.77 |
| 3:30:08 PM | 42.9407 | 170.139 | 90.075 | 4.94 |
| 3:30:18 PM | 42.9407 | 170.703 | 123.685 | 5.31 |
| 3:30:28 PM | 42.9641 | 171.347 | 129.39 | 5.37 |
| 3:30:38 PM | 43.0187 | 172.012 | 131.364 | 4.60 |
| 3:30:48 PM | 43.0655 | 172.52 | 130.601 | 4.84 |
| 3:30:58 PM | 43.0967 | 172.947 | 130.601 | 5.21 |

TABLE 1-continued

| Time | Temperature (° F.) of Cold Water | Temperature (° F.) of Hot Water | Temperature (° F.) of Mixed Water | Pressure of hot water at mixing point |
|---|---|---|---|---|
| 3:31:08 PM | 43.1514 | 172.906 | 130.983 | 5.20 |
| 3:31:18 PM | 43.1358 | 172.798 | 131.315 | 4.88 |
| 3:31:28 PM | 43.1748 | 173.17 | 131.647 | 4.61 |
| 3:31:38 PM | 43.206 | 173.698 | 131.704 | 5.07 |
| 3:31:48 PM | 43.2372 | 174.064 | 131.739 | 4.94 |
| 3:31:58 PM | 43.2684 | 174.287 | 131.986 | 4.51 |
| 3:32:08 PM | 43.3152 | 174.402 | 132.276 | 5.23 |
| 3:32:18 PM | 43.323 | 174.442 | 132.445 | 5.08 |
| 3:32:28 PM | 43.3698 | 174.524 | 132.636 | 4.23 |
| 3:32:38 PM | 43.4322 | 174.483 | 132.706 | 5.11 |
| 3:32:48 PM | 43.4406 | 174.515 | 132.663 | 4.55 |
| 3:32:58 PM | 43.4874 | 174.488 | 132.536 | 4.58 |
| 3:33:08 PM | 43.503 | 174.508 | 132.536 | 5.14 |
| 3:33:18 PM | 43.5186 | 174.508 | 132.472 | 4.33 |
| 3:33:28 PM | 43.5498 | 174.535 | 124.097 | 4.83 |
| 3:33:38 PM | 43.5654 | 174.596 | 136.853 | 5.53 |
| 3:33:48 PM | 43.5888 | 174.657 | 143.873 | 5.07 |
| 3:33:58 PM | 43.6512 | 174.623 | 146.047 | 5.39 |
| 3:34:08 PM | 43.6512 | 174.664 | 146.339 | 5.77 |
| 3:34:18 PM | 43.6902 | 174.731 | 146.443 | 5.84 |
| 3:34:28 PM | 43.7447 | 174.657 | 146.589 | 5.72 |
| 3:34:38 PM | 43.7993 | 174.738 | 146.624 | 5.65 |
| 3:34:48 PM | 43.8461 | 174.779 | 148.618 | 5.48 |
| 3:34:58 PM | 43.9007 | 174.846 | 152.621 | 5.61 |
| 3:35:08 PM | 43.9163 | 174.826 | 153.16 | 5.58 |
| 3:35:18 PM | 43.9708 | 174.738 | 153.36 | 6.05 |
| 3:35:28 PM | 44.002 | 174.813 | 153.395 | 5.26 |
| 3:35:38 PM | 44.0569 | 174.818 | 153.463 | 5.28 |
| 3:35:48 PM | 44.1192 | 174.872 | 153.47 | 5.98 |
| 3:35:58 PM | 44.1816 | 174.859 | 153.504 | 5.84 |
| 3:36:08 PM | 44.2544 | 174.895 | 153.514 | 4.46 |
| 3:36:18 PM | 44.2934 | 174.875 | 151.779 | 4.84 |
| 3:36:28 PM | 44.309 | 174.712 | 139.422 | 3.03 |
| 3:36:38 PM | 44.3012 | 174.679 | 116.732 | 2.69 |
| 3:36:48 PM | 44.2778 | 174.374 | 108.42 | 2.70 |
| 3:36:58 PM | 44.2154 | 174.178 | 101.754 | 0.76 |
| 3:37:08 PM | 44.1843 | 174.023 | 99.4504 | 1.08 |
| 3:37:18 PM | 44.1609 | 173.671 | 95.4277 | 1.91 |
| 3:37:29 PM | 44.1297 | 173.461 | 94.3308 | 0.03 |
| 3:37:39 PM | 44.0362 | 173.386 | 88.8547 | 0.03 |
| 3:37:49 PM | 43.927 | 172.953 | 75.2487 | 0.03 |
| 3:37:59 PM | 43.8257 | 172.52 | 71.861 | 0.03 |
| 3:38:09 PM | 43.7399 | 172.255 | 70.7566 | 0.03 |
| 3:38:19 PM | 43.7009 | 172.086 | 70.1736 | 0.03 |
| 3:38:29 PM | 43.6619 | 171.889 | 69.8857 | 0.03 |
| 3:38:39 PM | 43.6235 | 171.752 | 66.6978 | 0.03 |
| 3:38:49 PM | 43.5377 | 171.508 | 53.2521 | 0.03 |
| 3:38:59 PM | 43.5221 | 171.379 | 48.2911 | 0.03 |
| 3:39:09 PM | 43.5065 | 171.148 | 46.4735 | 0.03 |
| 3:39:19 PM | 43.4909 | 171.107 | 45.6879 | 0.03 |
| 3:39:29 PM | 43.4519 | 171.012 | 45.1586 | 0.03 |
| 3:39:39 PM | 43.3739 | 170.741 | 44.9873 | 0.03 |
| 3:39:49 PM | 43.3115 | 170.66 | 44.6913 | 0.03 |
| 3:39:59 PM | 43.2647 | 170.361 | 44.6368 | 0.03 |
| 3:40:09 PM | 43.2413 | 170.252 | 44.5822 | 0.03 |
| 3:40:19 PM | 43.2023 | 170.089 | 44.5433 | 0.03 |
| 3:40:29 PM | 43.1867 | 169.695 | 47.2817 | 0.03 |
| 3:40:39 PM | 43.1477 | 169.152 | 49.6559 | 0.03 |
| 3:40:49 PM | 43.1817 | 168.801 | 50.65 | 0.03 |
| 3:40:59 PM | 43.1895 | 168.474 | 50.7661 | 0.03 |
| 3:41:09 PM | 43.1505 | 168.188 | 51.1221 | 0.03 |
| 3:41:19 PM | 43.1165 | 167.805 | 51.127 | 0.03 |
| 3:41:29 PM | 43.1583 | 167.569 | 51.1453 | 0.03 |
| 3:41:39 PM | 43.1506 | 166.683 | 51.1221 | 5.70 |
| 3:41:49 PM | 43.1896 | 168.556 | 93.6402 | 5.33 |
| 3:41:59 PM | 43.2442 | 169.31 | 137.937 | 5.51 |
| 3:42:09 PM | 43.252 | 170.343 | 146.154 | 6.10 |
| 3:42:19 PM | 43.3222 | 171.076 | 148.315 | 6.05 |
| 3:42:29 PM | 43.3768 | 171.93 | 149.619 | 6.08 |
| 3:42:39 PM | 43.4002 | 171.869 | 150.679 | 5.98 |
| 3:42:49 PM | 43.4782 | 171.883 | 151.517 | 5.71 |
| 3:42:59 PM | 43.5484 | 172.622 | 151.994 | 6.04 |
| 3:43:09 PM | 43.6264 | 173.312 | 152.056 | 5.45 |
| 3:43:19 PM | 43.681 | 173.387 | 151.635 | 0.03 |
| 3:43:29 PM | 43.5328 | 173.238 | 76.0342 | 0.03 |
| 3:43:39 PM | 43.4938 | 172.716 | 51.1144 | 0.03 |
| 3:43:49 PM | 43.4626 | 172.628 | 46.7018 | 0.03 |
| 3:43:59 PM | 43.2832 | 172.649 | 45.9164 | 0.03 |
| 3:44:09 PM | 43.1896 | 170.696 | 54.4813 | 0.03 |
| 3:44:19 PM | 43.1194 | 170.316 | 63.2646 | 0.03 |
| 3:44:29 PM | 43.0884 | 170.621 | 62.9592 | 0.03 |
| 3:44:39 PM | 43.0337 | 171.211 | 60.8798 | 0.03 |
| 3:44:49 PM | 43.0259 | 171.116 | 60.5047 | 0.03 |
| 3:44:59 PM | 42.9713 | 170.98 | 57.6287 | 0.03 |
| 3:45:09 PM | 42.8933 | 170.919 | 56.1526 | 0.03 |
| 3:45:19 PM | 42.8152 | 170.668 | 55.9295 | 0.03 |
| 3:45:29 PM | 42.7528 | 170.315 | 55.7755 | 0.03 |
| 3:45:39 PM | 42.7294 | 170.01 | 54.5354 | 0.03 |
| 3:45:49 PM | 42.7684 | 170.566 | 54.7897 | 6.72 |
| 3:45:59 PM | 42.7918 | 171.53 | 140.362 | 6.67 |
| 3:46:09 PM | 42.8337 | 172.231 | 163.43 | 7.06 |
| 3:46:20 PM | 42.8337 | 172.705 | 168.136 | 6.64 |
| 3:46:30 PM | 42.8493 | 172.766 | 167.121 | 0.03 |
| 3:46:40 PM | 43.1146 | 172.664 | 166.42 | 0.03 |
| 3:46:50 PM | 43.3019 | 172.522 | 134.064 | 0.03 |
| 3:47:00 PM | 43.2083 | 172.17 | 64.1372 | 0.03 |
| 3:47:10 PM | 43.5281 | 171.919 | 65.7372 | 0.03 |
| 3:47:20 PM | 43.5281 | 171.817 | 76.383 | 0.03 |
| 3:47:30 PM | 43.5437 | 171.614 | 83.1848 | 0.03 |
| 3:47:40 PM | 43.5671 | 171.485 | 84.8249 | 0.03 |
| 3:47:50 PM | 43.5671 | 171.363 | 85.5247 | 0.03 |

Figure 19A:
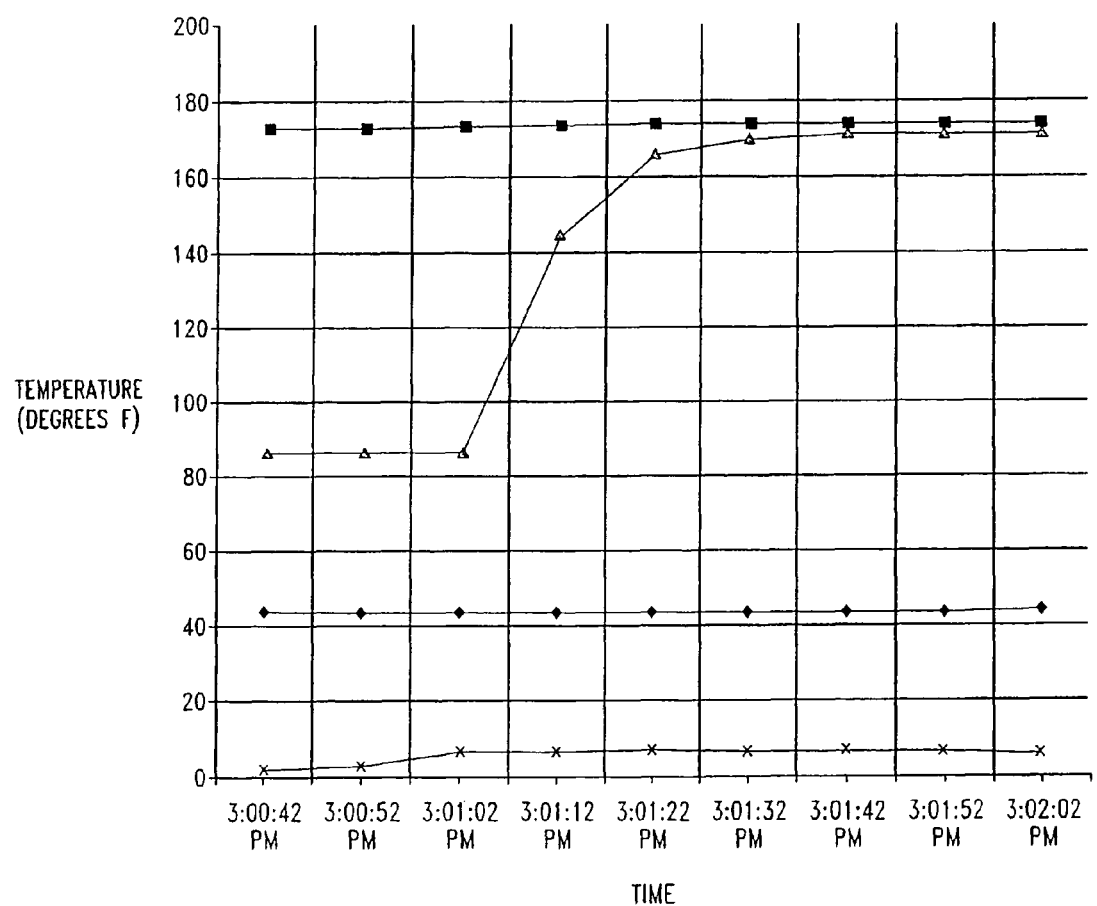
FIGS. 19A through 19G are graphical data, also shown in tabular form in Table 1, of a test performed with a circulation system including hot and cold inlets, a diffuser similar to the diffuser of FIG. 5, and a mixed fluid outlet coupled to the diffuser, wherein -♦- represents cold water, -■- represents hot water, -▲- represents mixed water temperature, and -x- represents water pressure.
Figure 19B:
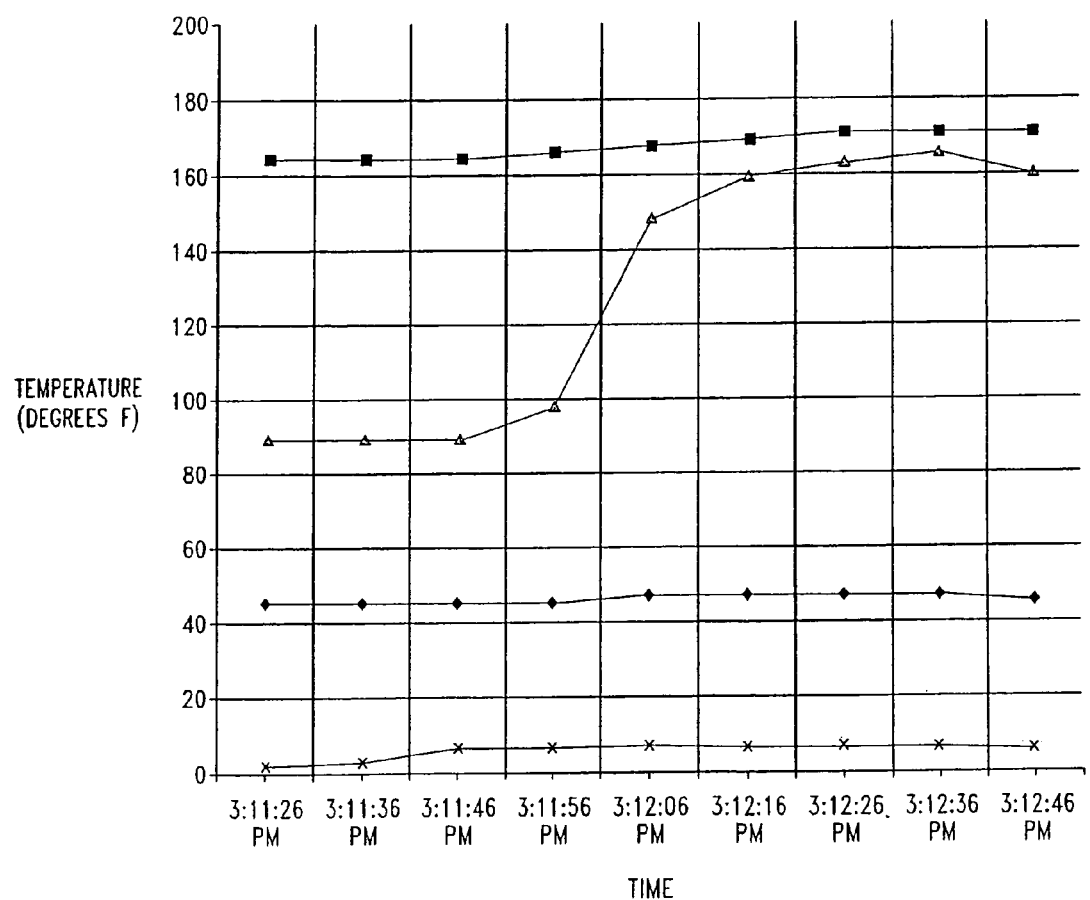
Figure 19C:
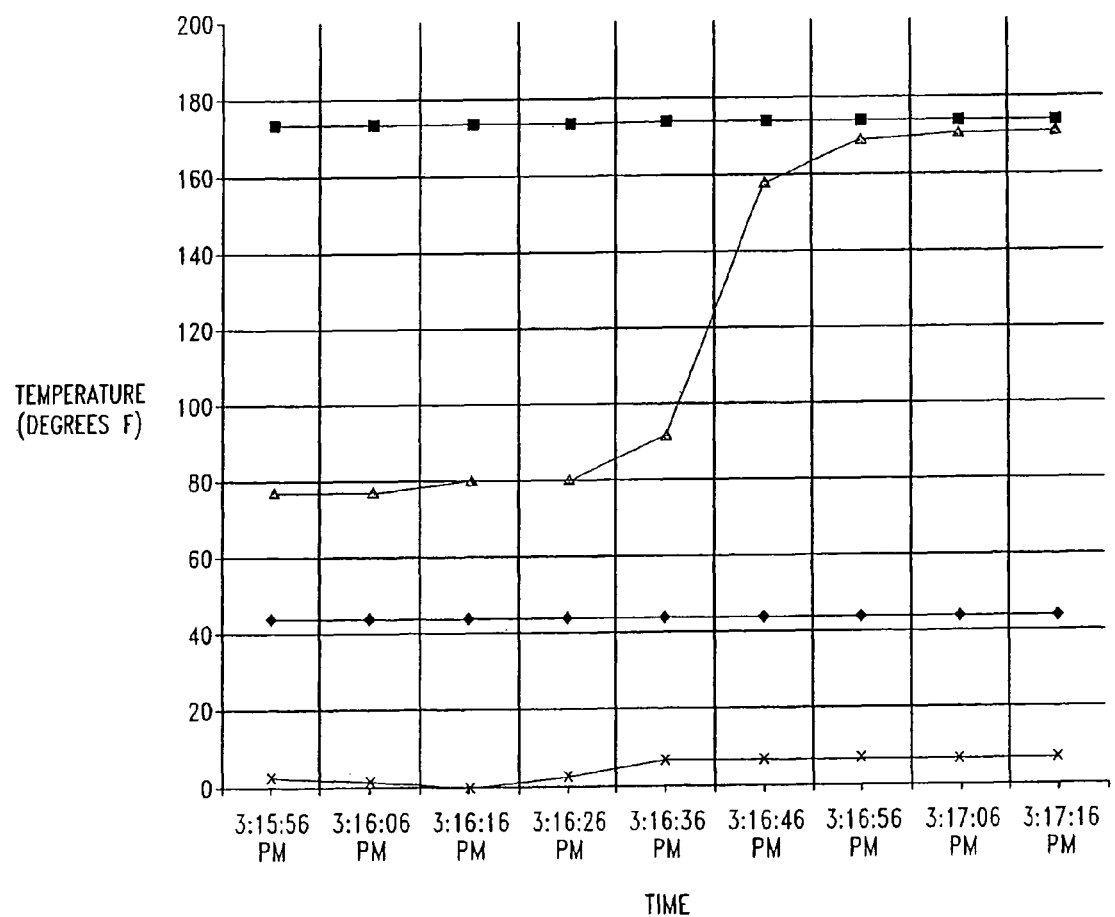
Figure 19D:
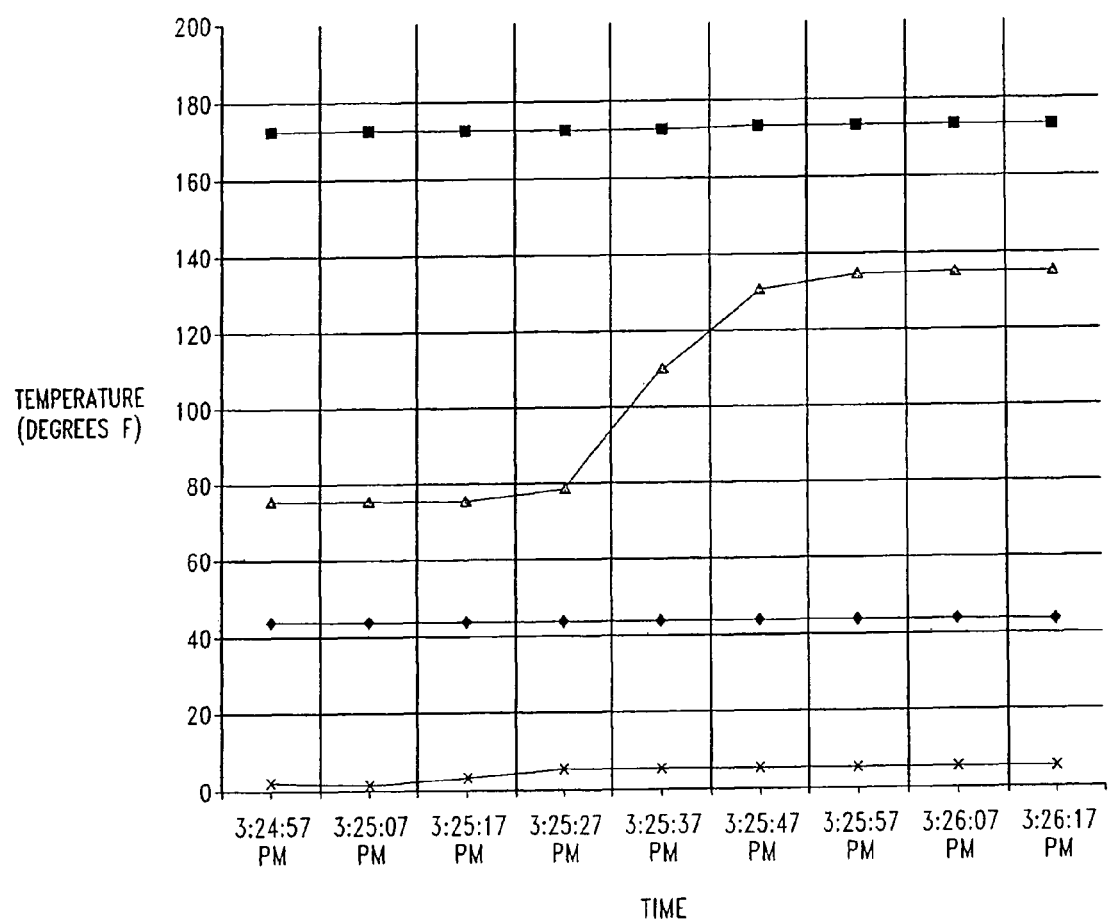
Figure 19E:
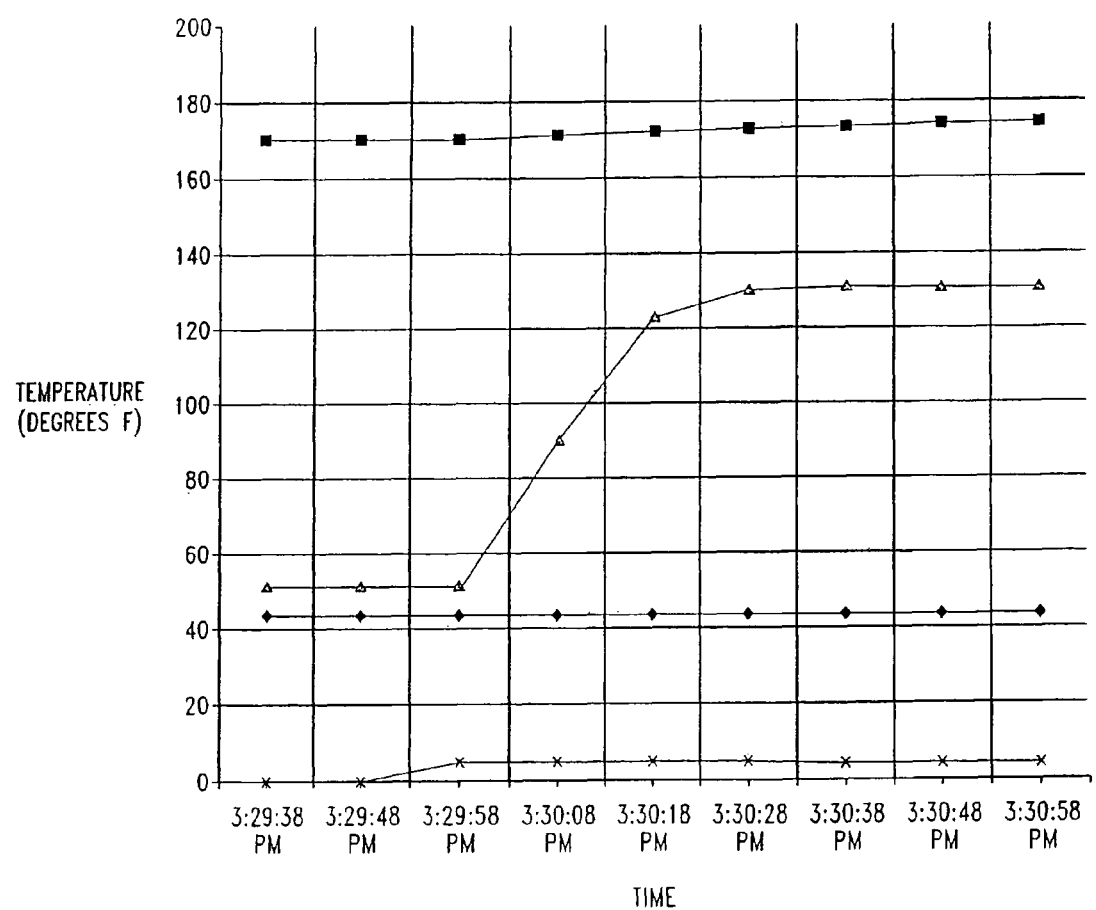
Figure 19F:
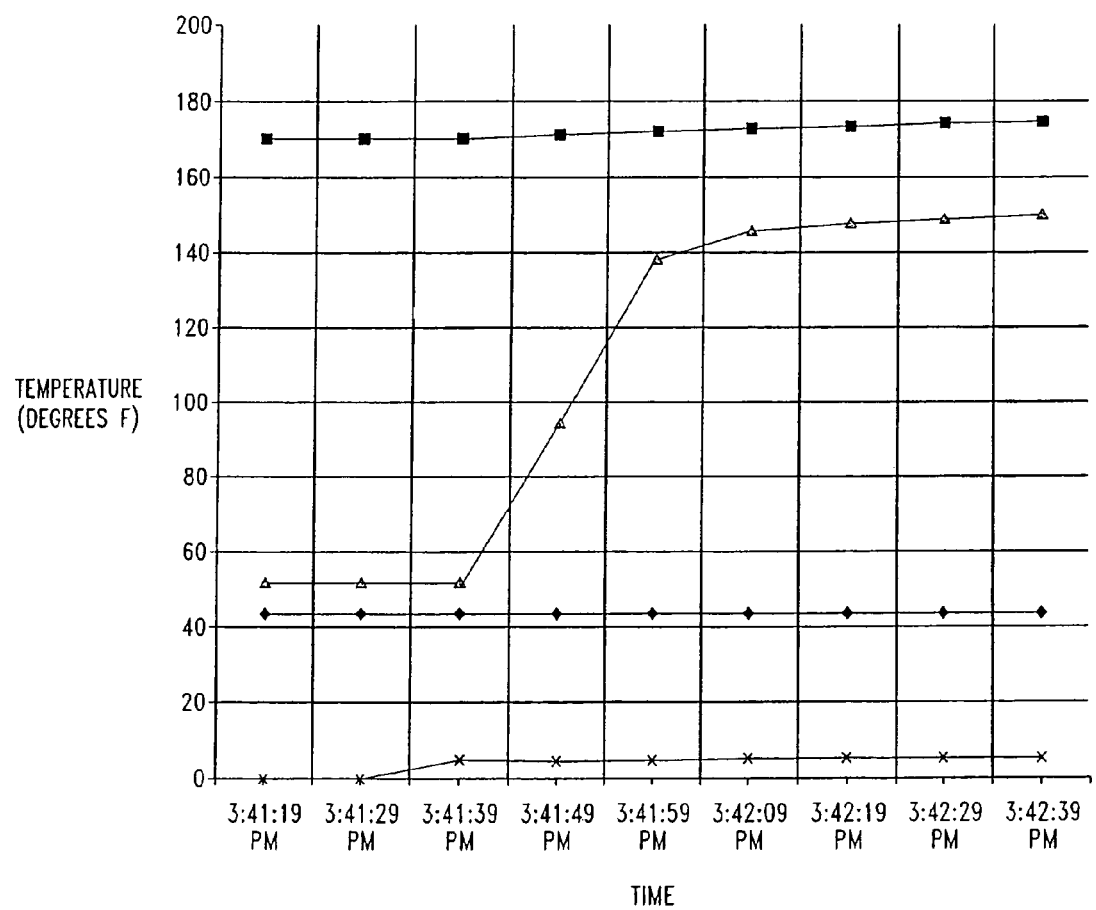
Figure 19G:
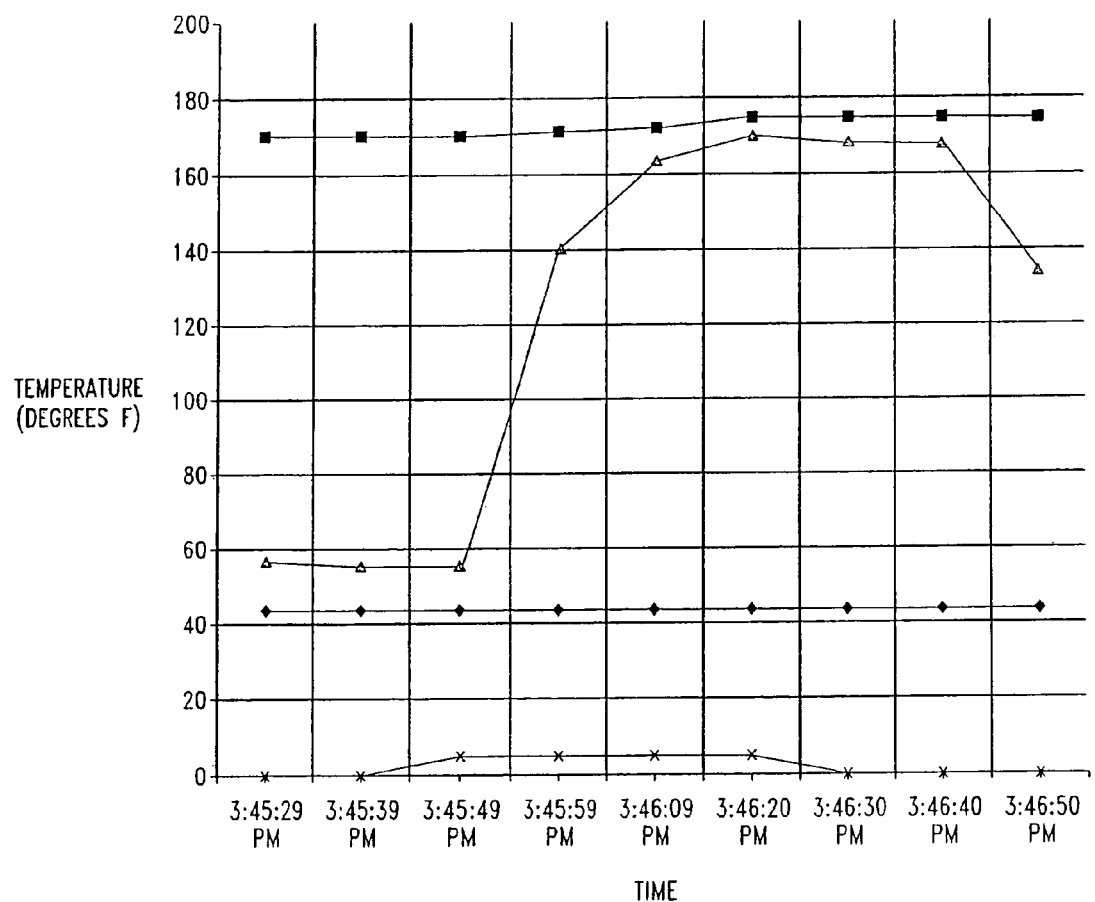
Figure 20:
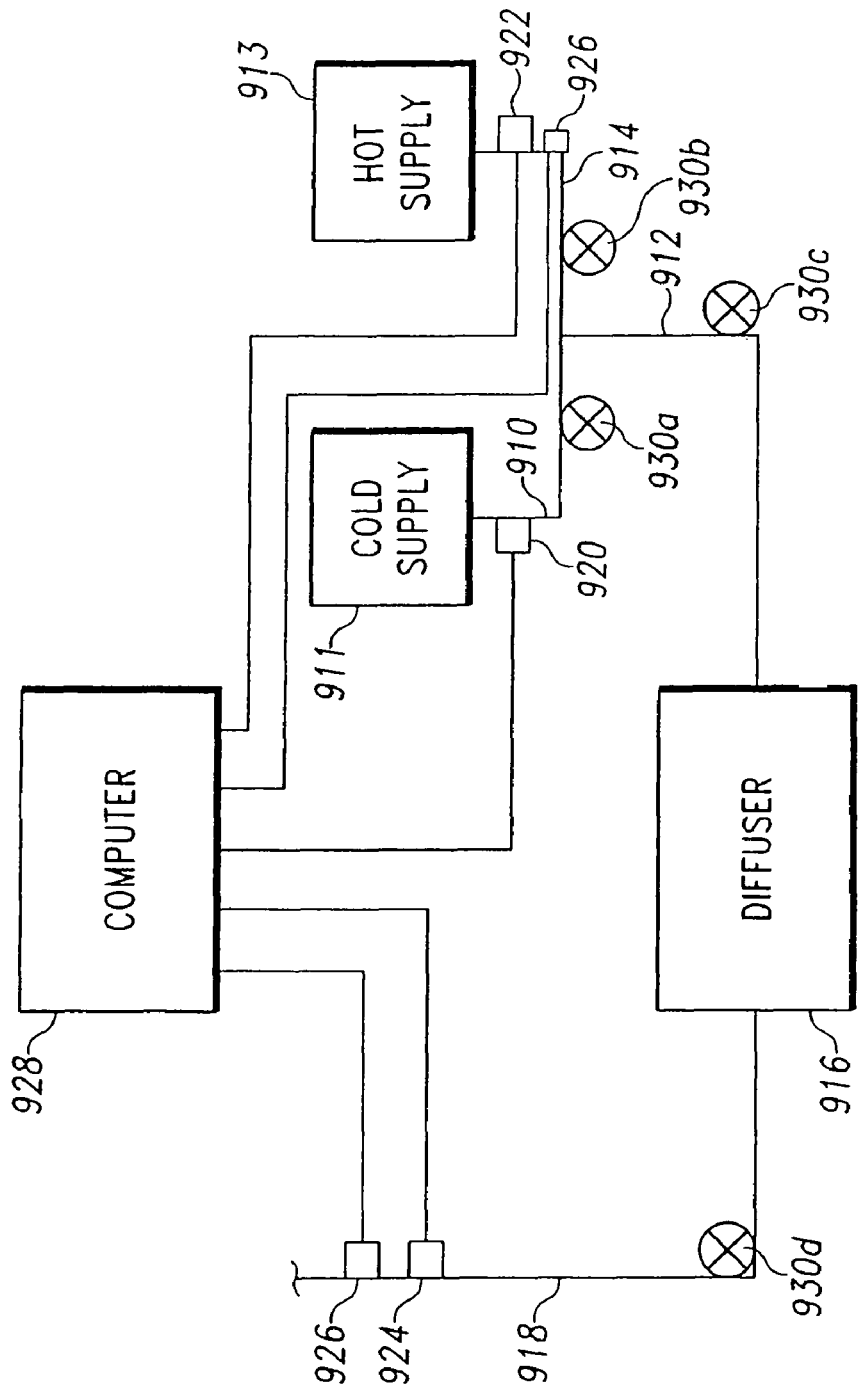
FIG. 20 is a diagrammatic view of a test apparatus showing a cold fluid supply, a hot fluid supply, a mixed fluid outlet, a diffuser coupled between the supplies and the mixed fluid outlet, and decontamination apparatus including a plurality of sensors coupled to the test apparatus to provide data.

FIG. 20 depicts a diagrammatic or schematic diagram of the test from which the above data were derived. In the test represented by the data of Table I and FIGS. 19A-G, and as schematically depicted in FIG. 20, a cold water line 910 from cold water supply 911 was coupled to a mixed water inlet 912, a hot water line 914 from hot water supply 913 was coupled to mixed water inlet 912. A diffuser 916 was coupled to mixed water inlet 912 so that hot and cold water flowed through mixed water inlet 912 and into diffuser 916. A mixed water outlet 918 was coupled to diffuser 916 so that water flowing from the diffuser passed through outlet 918 toward a drain (not shown). Thermocouples 920, 922, 924, were coupled to cold inlet, hot inlet, and mixed fluid outlet lines respectively to measure the temperature of the water flowing through each. A pressure sensor 926 was positioned in the hot water line to sense the pressure in the hot water. Thermocouples 920, 922, 924 and sensor 926 were coupled to computer 928 which recorded the data from each thermocouple, as depicted in Table 1 above. Valves 930 were positioned in each of the water lines to shut off or throttle flow of the hot, cold, and/or mixed water as necessary.

To simulate different stagnant hot fluid line temperatures that might be encountered in different settings, a starting mixed water temperature was arrived at by adjusting the hot 930b and cold 930a valves until a desired temperature was reached. For example, FIG. 19A shows a starting mixed fluid temperature of about 85 degrees F. Once the desired starting temperature for the mixed water was achieved, all flow was simultaneously shut off. Then, the hot water valve 930b was opened full-open to simulate the hot water displacing the stagnant water in the hot water line. Mixed water temperature in the mixed water outlet line was recorded via thermocouple 924 (shown in the fourth column). Cold and hot water temperatures were recorded via thermocouples 920 and 922 in the cold and hot water lines respectively, those temperatures shown in the second and third columns respectively. The time of day each reading was made is indicated in the first column, each entry separated from the prior entry by ten seconds. The pressure, represented in the fifth column, was recorded in the hot water line, is shown in pounds per square inch gauge (psig), and serves to indicate when the hot water was opened to the full-open position.

Thermocouple 920 was about 6 feet away from the point where cold inlet line 910 connects to mixed inlet line 912, and thermocouple 922 was about 6 feet away from the point where hot inlet line 914 connects to mixed inlet line 912 (each distance of about 6 feet including about 2 feet of rubber hose). Thermocouple 924 and sensor 926 were about 5 feet away (about 3 feet of which was rubber hose) from the point where diffuser 916 connects to mixed outlet line 918.

FIGS. 19A through G represent graphically certain data from Table 1. Data were taken at ten (10) second intervals. The mixed water temperature is observed to increase to a local maximum in each of the graphs depicted in FIGS. 19A through G. The starting temperature of the mixed water was controlled by adjusting the hot valve while leaving the cold valve in the full-open position to achieve a desired starting mixed water temperature. The gradual increase in mixed water temperature, compared to plug flow through a single pass of pipe resulting in a nearly immediate jump to hot water of equal temperature with the temperature of the hot water in the water heater tank, demonstrates the effects of the diffuser.

Although this invention has been described and illustrated in detail with reference to certain illustrative embodiments, variations and modifications exist within the scope and spirit of the invention as described and defined in the following claims.

The invention claimed is:

1. A decontamination apparatus comprising:
   a fluid supply source,
   a first fluid line receiving fluid from the source,
   a heat exchange assembly receiving fluid from the source and configured to heat the fluid and provide a heated second fluid stream,
   a first mixing valve comprising a valve body formed to include a first fluid inlet to receive fluid from the first fluid line, a second fluid inlet to receive the heated second fluid stream from said heat exchange assembly, and a mixed fluid outlet,
   a restrictor adapted and configured for creating a pressure drop in the first fluid line;
   a nozzle coupled to the mixed fluid outlet configured to discharge the mixed fluid, and
   a support interconnecting at least the heat exchange assembly, first and second fluid lines, the first mixing valve, and the nozzle, the support operable to permit movement of the apparatus as a unit.

2. The apparatus of claim 1, wherein said restrictor comprises one or more pressure reducing valves positioned between the first mixing valve and the first fluid line.

3. The apparatus of claim 1, wherein said restrictor comprises one or more pressure reducing valves positioned between the first mixing valve and the second fluid line.

4. The apparatus of claim 1, further comprising a second mixing valve comprising a valve body formed to include a first fluid inlet to receive the first fluid from the first fluid line, a second fluid inlet to receive a second fluid from a second fluid tine, and a mixed fluid outlet.

5. The apparatus of claim 1, wherein the support comprises a platform having a generally upwardly facing surface supporting the heat exchange assembly, first mixing valve, and nozzle, and a plurality of support members coupled to and extending downwardly from the platform.

6. The apparatus of claim 5, wherein the heat exchange assembly is an electric heater operable to heat the first fluid to at least about 180 degrees F.

7. The apparatus of claim 1, wherein both the first and second fluid lines comprise fluid provided by the fluid supply source.

8. The apparatus of claim 7, further comprising a junction in fluid communication with the fluid supply inlet, the junction splitting flow of fluid from the fluid supply source into the first fluid line and the second fluid line.

9. The apparatus of claim 1, further comprising a diffuser coupled between the first fluid line and the first inlet to the first mixing valve, the diffuser including a first fluid conduit and at least a second fluid conduit, a majority of the first fluid conduit being surrounded by the second fluid conduit, the first and second conduits being coupled together to cause fluid to flow into the first conduit, pass through the first conduit, and into fluid outside the first conduit and in the second conduit.

10. The apparatus of claim 9, wherein the first conduit is formed to include a plurality of apertures, the first and second conduits are coupled together, and a first portion of the fluid flows through the plurality of apertures and a second portion of the fluid flows from the first conduit through an end of the first conduit into fluid outside the first conduit and in the second conduit.

11. The apparatus of claim 1, wherein the nozzle is a drench shower having fluid outlets directed at least partially downwardly.

12. The apparatus of claim 1, further comprising a filter in fluid connection with the first fluid line.

13. The apparatus of claim 1, further comprising a heat trap positioned in fluid connection with the first fluid line.

14. The apparatus of claim 1 wherein said first mixing valve is a thermostatically controlled mixing valve, and the valve thermostatically controls the temperature of the mixed fluid.

15. A decontamination apparatus comprising:
   a fluid heater,
   a cold fluid supply line,
   a hot fluid supply line for supplying hot fluid from the fluid heater to a first thermostatic mixing valve,
   the first thermostatic mixing valve having a hot fluid inlet for receiving fluid from the hot fluid supply line, a cold fluid inlet for receiving fluid from the cold fluid supply line, and a mixed fluid outlet for supplying fluid to a mixed fluid supply line through which one, the other, or both of the hot and cold fluids flow from the first thermostatic mixing valve,
   at least one means for restricting flow of at least one of the cold fluid in the cold fluid line and the hot fluid in the hot fluid line;
   an emergency fixture connected to the mixed fluid supply line for supplying fluid therefrom to a user and configured to deliver the mixed fluid at a flow rate and pattern to decontaminate effectively at least a portion of the users body, and
   a diffuser coupled between the hot fluid supply line and the first thermostatic mixing valve for increasing the time over which a temperature change is observed at the hot fluid inlet.

16. The apparatus of claim 15, wherein the at least one means for restricting flow comprises one or more restrictors positioned between the first thermostatic mixing valve and at least one of the cold fluid supply line and the hot fluid supply line.

17. The apparatus of claim 15, wherein the at least one means for restricting flow comprises one or more pressure reducing valves positioned between the first thermostatic mixing valve and at least one of the cold fluid supply line and the hot fluid supply line.

18. The apparatus of claim 15, further comprising a second thermostatic mixing valve having a hot fluid inlet for receiving fluid from the hot fluid supply line, a cold fluid inlet for receiving fluid from the cold fluid supply line, and a mixed fluid outlet for supplying fluid to a mixed fluid supply line through which one, the other, or both of the hot and cold fluids flow from the second thermostatic mixing valve.

19. The apparatus of claim 15, further comprising a heat trap positioned in fluid connection with the cold fluid supply line.

20. A decontamination apparatus comprising:
a fluid supply inlet configured for coupling to a fluid supply source,
a heater to heat fluid received from said fluid supply source;
a decontamination fixture in fluid connection with the circulation network to receive mixed fluid from the mixed fluid outlet;
a first mixing valve comprising a valve body formed to include a first fluid inlet to receive fluid from the source in a first fluid line, a second fluid inlet to receive heated fluid from a second fluid line, a chamber for mixing the first fluid and the second fluid to provide a mixed fluid, and a mixed fluid outlet for providing mixed fluid; and
at least one means for restricting flow of the first fluid stream in the first fluid line, wherein fluid flowing through said restricting means is provided to said first mixing valve.

21. The apparatus of claim 20, wherein the at least one means for restricting flow comprises one or more restrictors.

22. The apparatus of claim 20, wherein the at least one means for restricting flow comprises one or-more pressure reducing valves.

23. The apparatus of claim 22 wherein a pressure reducing valve is placed in the first fluid line.

24. The apparatus of claim 22 wherein a pressure reducing valve is placed in the second fluid line.

25. The apparatus of claim 20, which further comprises a support interconnecting at least the heater and the decontamination fixture to permit movement of the apparatus as a unit wherein the support is a pallet into which the tines of a fork truck can be inserted to lift and move the apparatus as a unit.

26. The apparatus of claim 20, wherein the decontamination fixture includes a valve operated by an actuator, and operation of the actuator causes fluid to flow through the first mixing valve and through the decontamination fixture.

27. The apparatus of claim 26, wherein operation of the actuator causes the heater to ignite and heat the fluid flowing through the circulation network.

28. The apparatus of claim 20, further comprising a fuel tank to store fuel usable by the heater to generate heat for heating the fluid in the circulation network.

29. The apparatus of claim 20, further comprising a second mixing valve comprising a valve body formed to include a first fluid inlet to receive a first fluid from a first fluid line, a second fluid inlet to receive a second fluid from a second fluid line, and a mixed fluid outlet.

30. The apparatus of claim 20, further comprising a heat trap positioned in fluid connection with the first fluid line.

31. The apparatus of claim 20 wherein said first mixing valve is a thermostatically controlled mixing valve, and the valve thermostatically controls the temperature of the mixed fluid.

* * * * *

UNITED STATES PATENT AND TRADEMARK OFFICE
CERTIFICATE OF CORRECTION

PATENT NO. : 8,209,796 B2  Page 1 of 1
APPLICATION NO. : 11/493164
DATED : July 3, 2012
INVENTOR(S) : Robert Eveleigh and Gary Cook It is certified that error appears in the above-identified patent and that said Letters Patent is hereby corrected as shown below:

IN THE CLAIMS:

In col. 27, claim 4, line 59, please delete the word "tine" and insert in lieu thereof --line--.

Signed and Sealed this
Eleventh Day of September, 2012

David J. Kappos
*Director of the United States Patent and Trademark Office*